United States Patent [19]
Okita

[11] Patent Number: 6,154,379
[45] Date of Patent: Nov. 28, 2000

[54] ELECTRIC POWER CONVERSION DEVICE

[75] Inventor: Yoshihisa Okita, Tokyo, Japan

[73] Assignee: TDK Corporation, Tokyo, Japan

[21] Appl. No.: 09/353,879

[22] Filed: Jul. 15, 1999

[30] Foreign Application Priority Data

Jul. 16, 1998 [JP] Japan .................................. 10-201539
Nov. 16, 1998 [JP] Japan .................................. 10-325723

[51] Int. Cl.[7] ............................. H02M 1/12; H02M 7/44
[52] U.S. Cl. ................................. 363/40; 363/98; 363/56
[58] Field of Search .................................. 363/39, 44, 45,
363/46, 47, 48, 40, 41, 52, 53, 55, 56,
89, 98, 132; 323/132, 207

[56] References Cited

U.S. PATENT DOCUMENTS

| 5,177,428 | 1/1993 | Hirose et al. | 323/207 |
|---|---|---|---|
| 5,309,349 | 5/1994 | Kwan | 363/98 |
| 5,867,376 | 2/1999 | Nakamura et al. | 363/56 |

FOREIGN PATENT DOCUMENTS

| 2534035 | 12/1991 | Japan . |
|---|---|---|
| 4-121062 | 4/1992 | Japan . |
| 7-175541 | 7/1995 | Japan . |
| 8-322266 | 12/1996 | Japan . |
| 9-47040 | 2/1997 | Japan . |
| 9-294380 | 11/1997 | Japan . |
| 10-56739 | 2/1998 | Japan . |

Primary Examiner—Jessica Han
Attorney, Agent, or Firm—Frishauf, Holtz, Goodman, Langer & Chick, P.C.

[57] ABSTRACT

The electric power conversion device includes an AC section, a DC section, a switching section connected between the AC section and the DC section for making power conversion by switching operation, and a control section for control the switching section. In the DC section is installed a ripple detection device for detecting a ripple component emerging into the DC side and for generating a ripple detection signal. When the DC component is included in the output current of the AC section, a ripple component having the same frequency with the AC frequency of the AC section output current is superimposed in the DC section. The ripple detection device is installed in the DC section, and thereby the ripple component emerging into the DC section is detected by the ripple detection device as a reflection of the DC offset included in the output current. The control section receives the ripple detection signal from the ripple detection device, generates the DC component compensation signal for controlling the DC component included in the AC side current based on the ripple detection signal, and controls the switching section by the control signal including the DC component compensation signal to compensate the DC offset.

16 Claims, 20 Drawing Sheets

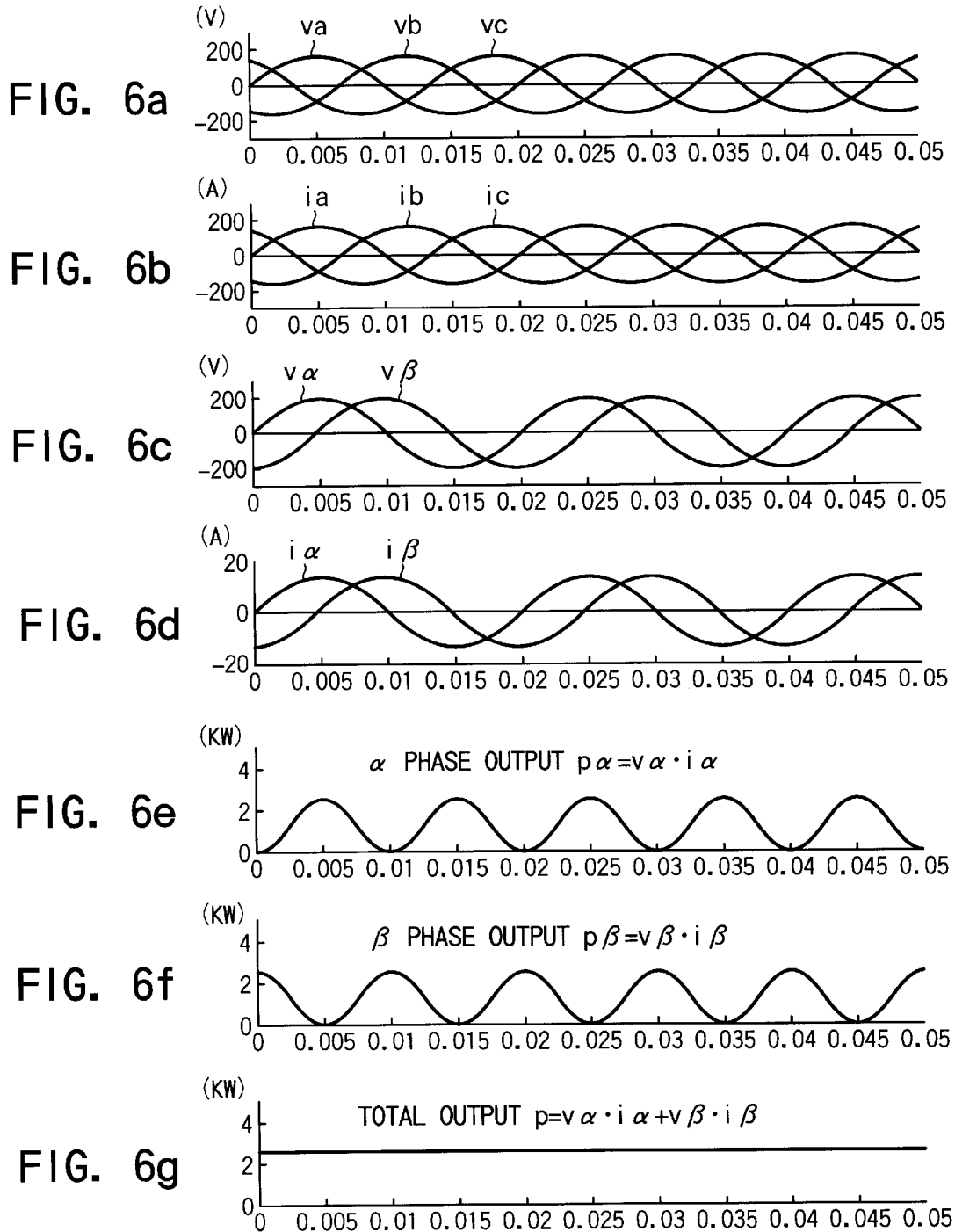

ELECTRIC POWER CONVERSION DEVICE

FIELD OF THE INVENTION

The present invention relates to an electric power conversion device connected between direct current (hereafter referred to as DC sometimes) power system and single-phase or three-phase alternating current (hereafter referred to as AC sometimes) power system, for operating therebetween. In particular, the invention relates to a control of DC component included in an AC output current from this type of power conversion device. The power conversion device of the present invention includes an inverter device, an active filter, a converter device, or the like.

PRIOR ART

Semiconductor power conversion device employing a semiconductor switching device is used in various applications. A typical example of this device is a normal and/or reverse conversion device between DC and AC. According to the semiconductor power conversion device above, the electric energy may be converted into desired form with high efficiency by combining control technology with a sensor circuit and an electronic circuit employed to support it.

As for a power conversion device connected to the three-phase AC power system for making normal, reverse or bi-directional conversion to use it, a normal conversion device of sinusoidal wave input type, a reverse conversion device used in a distributed power source etc., or an active filter may be referred to.

These types of power conversion devices accomplish an intended power conversion using a control technology and an electronic circuit to make it practical. On the other hand, since even a small error of a signal in a sensor circuit or an electronic circuit, which constitute a control device, might be reflected as an input/output error onto the power conversion device, the small error in the signal has a possibility of causing a damage on a power system installation. For example, DC component or low-frequency component included in AC output component of the power conversion device might non-uniformly magnetize an iron core of transformer and thereby generate extreme rush current to damage the implements, which will be referred to as one of the above problems.

For example, in a "Technical guideline for distributed power source system interconnection (Japan Electric Association JEAG 9701)" which is applied to a reverse conversion device for system interconnection of the distributed power source, it is described that the DC component included in AC output current should be controlled within 1.0% of the rated effective current in order to prevent non-uniform magnetization of pole transformer which might be caused by the DC component included in the AC output from the reverse conversion device.

In order to improve these problems, it is proposed, for example, by Japanese Patent No. 2774685 that the DC component included in the output current is detected by a sensor and, based on a signal therefrom, the DC component of the output current is compensated for. In another example, a technology of system interconnection inverter for photovoltaic solar generation using a circuit having no transformer which would be installed on an AC output side is described in a lectured article collection (article No. 13) of joint research meeting (Nov. 30–Dec. 1 of 1995) of Japan Solar Energy Society and Japan Wind Energy Association. In the inverter disclosed by this article, on purpose to prevent DC component from flowing out to the AC output side, a current detector with good linearity is used for detecting AC current and an automatic zero adjusting circuit is added to the current detector so that a zero drift compensation may be usually applied to the detector.

In the conventional compensation technology of the DC component disclosed by above mentioned Patent, however, since the DC output error is detected by the detection circuit composed of a sensor and an amplifier circuit, an accuracy of the compensation depends on that of the sensor and a compensation section of the circuit. Accordingly, analogue parts used in the sensor and the compensation section were required to be of high accuracy and reliability as well as a pre-delivery adjustment was required for the factory, which left a cost-problem unsolved.

In addition, since the detection circuit is affected by the ambient temperature and the like, a temperature dependency of the detection circuit should be previously measured so that the compensation might be performed based on the information from the sensor. In order to avoid such complicated procedure, the parts with small variation in temperature dependency should be employed and the temperature sensor should be arranged, and thus the complexity of the system constitution as well as of the design procedure cannot be avoided. Further, since, in the conventional technique for preventing the flowing-out of the DC component in the system interconnection inverter without transformer introduced by the article in the lectured article collection mentioned above, the detection of the direct current which is one of the most basic information depends on the performance of the current detector, it is required to employ an expensive detector. In addition, since the output of the current detector is compensated by the automatic zero adjusting circuit, there is another problem that a complex and high grade circuit is required.

Furthermore, when a compensation circuit is employed for controlling the DC component of the output current based on a DC component signal detected by the detector, the compensation circuit itself is also required to be of small offset and drift characteristics, which causes another problem of requirement for high grade circuit. Especially in the distributed power generation system such as photovoltaic solar generation whose spread depends on lowering the cost thereof, using the expensive parts results in cost increase as a whole and might have a negative effect on a spread of the system.

SUMMARY OF THE INVENTION

An object of the present invention is to provide a power conversion device capable of controlling a generation of DC offset on the single-phase or three-phase AC system.

Another object of the invention is to provide a power conversion device which allows the cost of the whole device to be reduced by employing low-cost ripple detection means.

Still another object of the invention is to provide a highly reliable power conversion device which may minimize the effect of the temperature change and the aged deterioration.

In order to solve the problem described above, the present invention provides a power conversion device connected between DC power system and AC power system for transferring electric power between the DC power system and the AC power system, the device comprising an AC section connected to the AC power system, a DC section connected to the DC power system, a switching section connected between the AC and the DC sections for making power conversion by a switching operation, and a control device for controlling the switching section.

In the DC section, a ripple detection means is provided for detecting a ripple component emerging into the DC side and for generating a ripple detection signal.

This differs from the conventional system in a point that the ripple detection means is not installed in the AC section but in the DC section. When a current output from the switching section to the AC section (hereafter referred to as "output current") includes DC component (hereafter referred to as "DC offset"), a ripple component having the same frequency with the AC frequency of the output current of the AC section is superimposed in the DC section. In the present invention, the ripple detection means is installed in the DC section and thereby the ripple component emerging into the DC section is detected by the ripple detection means as a reflection of the DC offset included in the output current.

The control section receives the ripple detection signal from the ripple detection means, generates a compensation signal of the DC component based on the ripple detection signal for controlling the DC component included in the current of AC section, and controls the switching section by a control signal including the compensation signal of the DC component to compensate the DC offset. The compensation of the DC offset in the control section means to reduce the DC offset to zero as a matter of practice. Such operation is accomplished by controlling a switching operation of the switching section so that the component with AC frequency is not included in the ripple detection signal detected by the ripple detection means.

In the present invention, though it is necessary to install the ripple detection means in the DC section, which is an input side of the switching section, all the function required for this ripple detection means is merely to detect single-phase or three-phase AC frequency component. That is, since there is almost no effect of the error of DC offset or gain of the ripple detection means, a low-cost ripple detection means may be employed to reduce the cost of overall device. In addition, since the effect of temperature change and aged deterioration may be minimized, a highly reliable device may be accomplished.

The power conversion device according to the present invention includes a DC—AC inverter for converting the direct current to the single-phase or three-phase alternating current, an AC-DC converter device for converting the single-phase or three-phase alternating current to the direct current, an active filter and the like. The control section may be a computer, or a specified analogue or digital processing circuit or a combination thereof.

Further, a power conversion device according to another aspect of the invention comprises a power conversion means provided with a DC connecting section connected to a DC power source and an AC connecting section connected to an AC power source, an output power control means for controlling an output power of the power conversion means, a modulator means for operating an AC command value based on an output power command signal from the output power control means and for generating an AC command signal, and a current control means for controlling the power conversion means based on the current command signal from the modulator means, and further comprises a current detection means for detecting a DC side current of the power conversion means, and a DC component outflow blocking means for detecting, from a detected current value of the current detection means, the DC component included in an AC output emerging into the AC connecting section and for generating a signal to remove or reduce the DC component.

In an aspect of the invention, the DC component outflow blocking means comprises a filter means for extracting a current component having the same frequency with that of an AC fundamental wave component from the current signal which is an output of the current detection means, a multiplier for multiplying a reference sinusoidal wave synchronized with the system including the AC power source by an output signal of the filter means, and a compensation means for compensating the DC component of the AC output current in response to an output of the multiplier. In this case, it is preferable that the multiplier is a digital multiplier, and the filter means and the compensation means are formed to be digital means, and further a digital signal of reference sinusoidal wave synchronized with the system including the AC power source is supplied to the DC component outflow blocking means so that the multiplication of the reference sinusoidal wave and the output signal of the filter means may be operated in digital form. To add to that, it is preferable that the DC component outflow blocking means operates a compensation signal for compensating the DC component of the AC output current by the compensation means based on the output of the multiplier and adds the compensation signal to the AC command signal with reverse polarity. A direct current detecting function may be omitted from the current detection means, which make it possible to use the low-price current detection means.

BRIEF DESCRIPTION OF THE DRAWINGS

FIGS. 6(a–g) are waveform diagrams of the power conversion device of FIG. 4 when the DC offset is not included in the three-phase alternating side, wherein (a) is a three-phase voltage waveform, (b) is a three-phase current waveform, (c) is a two-phase voltage waveform, (d) is a two-phase current waveform, (e) is an α-phase output power waveform, (f) is a β-phase output power waveform, and (g) is an overall power waveform;

DETAILED DESCRIPTION OF THE PREFERRED EMBODIMENTS

Figure 1:
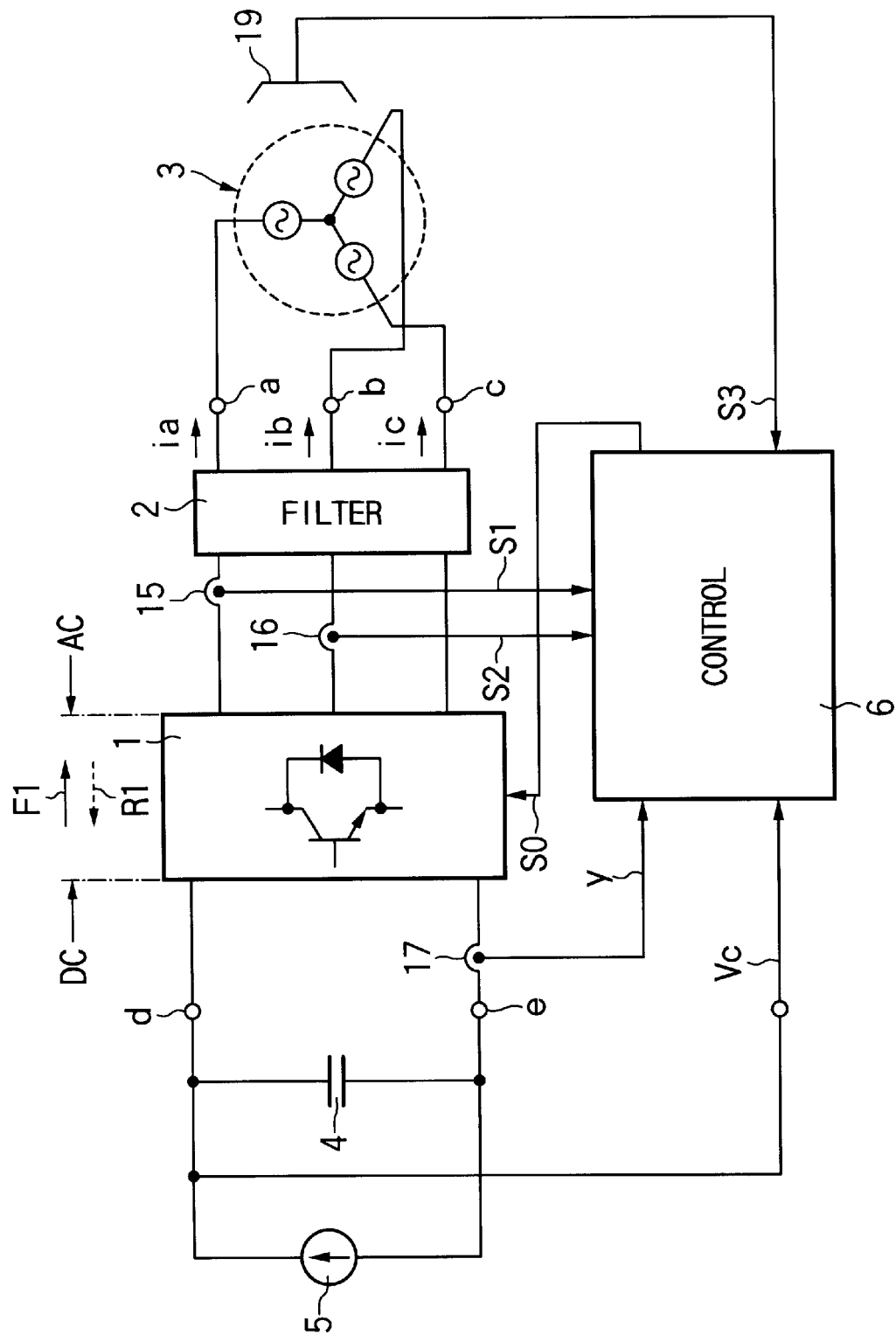
FIG. 1 is a schematic diagram of the power conversion device according to an embodiment of the present invention.

FIG. 1 is a schematic diagram of the power conversion device according to the present invention. FIG. 1 shows a three-phase AC interconnection inverter device. The power conversion device according to the invention comprises a switching section 1, a ripple detection means 17 and a control section 6. Reference numeral 2 designates a filter circuit.

The switching section 1 comprises a DC connecting section "d", "e", and a three-phase AC connecting section "a", "b", "c". The switching section 1 converts an electric power between a direct current side DC connected to the DC connecting section "d", "e" and a three-phase alternating current side AC connected to the three-phase connecting section "a", "b", "c". When a transfer of power is directed, as shown by an arrow F1, from the direct current side DC to the three-phase alternating current side AC, the switching section 1 operates as a DC—AC inverter (reverse conversion). In this case, the switching section 1 may employ any types of inverter circuits including non-insulation type inverter such as full-bridge type inverter or NPC inverter, and insulation type inverter. When a transfer of power is directed, as shown by an arrow R1, from the three-phase alternating current side AC to the direct current side DC, the switching section 1 operates as an AC—DC converter (normal conversion). In this case also, various types of circuit systems may be employed same as the case of the DC—AC inverter. The connecting section "d", "e" of the switching section 1 is provided with a DC power source 5 and a capacitor 4, and accordingly the switching section 1 is connected to the DC power source 5 and a direct current type loading. Each of the three-phase AC system 3, the capacitor 4 and the DC power source 5 may be treated as an external element or as an internal element.

A ripple detection means 17 detects a ripple component emerging into the direct current side DC as a reflection of the DC offset included in the output current. In an embodiment, only for the description, it is assumed that the ripple component of the current emerging into the direct current side DC will be detected. At that time, a current transformer is typically used as a ripple detection means 17. Any types of ripple detection means which response to the AC component may be employed.

The control section 6 receives a ripple detection signal "y" from the ripple detection means 17, generates a control signal for controlling the DC component included in the three-phase alternating current side AC based on the received ripple detection signal "y", controls the switching section 1 by a control signal S0 including the control signal, and thereby compensates the DC component included in the three-phase alternating current side AC.

In an embodiment, there are provided current sensors 15, 16 for detecting alternating currents ia, ib. The control section 6 controls a switching operation of the switching section 1 based on current detection signals S1, S2 of the current sensors 15, 16 so that the output currents ia, ib, ic of respective phases "a", "b", "c" coincide with a command value. Further, in this embodiment, the control section 6 receives a terminal voltage signal Vc of the capacitor 4 and a phase signal S3 detected by a voltage detection means 19 connected to the three-phase AC system 3, operates a current command value in sinusoidal wave form with a prescribed phase, and generates a current command signal corresponding to the current command value. The control section 6 supplies the switching section 1 with the control signal S0 including the current command signal to control the switching operation of the switching section 1. Furthermore, a filter 2 is provided between the current sensors 15, 16 and the three-phase AC connecting sections "a", "b", "c". The filter 2 selectively allows a component of the three-phase AC frequency f to pass through.

Figure 2:
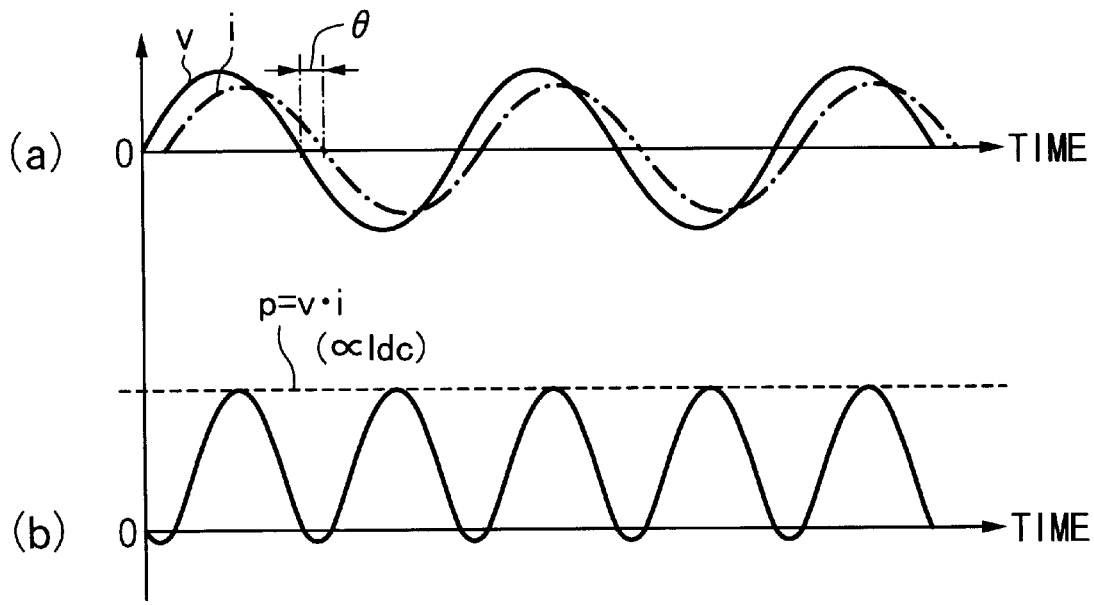
FIG. 2 is a voltage and power waveform diagram of the power conversion device of FIG. 1, wherein (a) shows voltage and current waveforms when the DC offset is not included in the three-phase AC section, and (b) shows power waveform diagram in this case.
Figure 3:
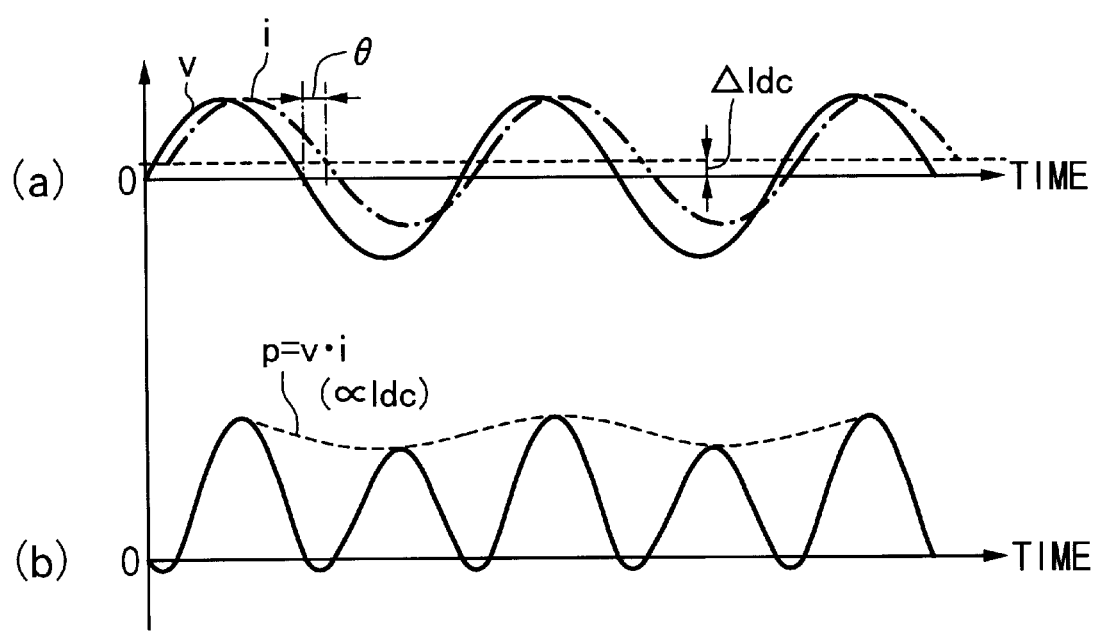
FIG. 3 is a voltage and power waveform diagram of the power conversion device of FIG. 1, wherein (a) shows voltage and current waveforms when the DC offset is included in the three-phase AC section, and (b) shows power waveform diagram in this case.

Different from the conventional system, the ripple detection means 17 is not installed in the three-phase alternating current side AC but in the direct current side DC. When the DC offset is included in the output current ia–ic output to the three-phase alternating current side AC, the ripple component having the same frequency f with that of the three-phase alternating current is superimposed in the direct current side DC. This will be described with reference to FIGS. 2, 3.

FIG. 2(a) shows waveforms of the output current i and the voltage V when the DC offset is not included. The output current i shows a current of one phase among three phase alternating currents, and the voltage V is a phase voltage. There is a phase difference θ between the voltage V and the output current i.

FIG. 2(b) shows a power waveform when there is phase difference θ as shown in FIG. 2(a). As well known, electric power P=V*i*cos (θ). In FIG. 2(b), the power P includes a mean power (DC component) and a frequency component having twice as much frequency 2f of the three-phase AC frequency f. Since FIG. 2(b) shows the case of the output current i including no DC offset, the power P makes a straight line without any level variation along the time. The current Idc flowing on the direct current side DC is proportional to the power P. Therefore, the current Idc flowing on the direct current side DC shows constant value having no variation along the time.

FIG. 3(a) shows waveforms of the output current i and the voltage V when the DC offset is included. Because of the DC offset ΔIdc, the waveform of the output current i is shifted upward by ΔIdc, the DC offset. Consequently, the power P varies as shown in FIG. 3(b). At that time, the power varies with a frequency f equal to that of the three-phase alternating current. Since the current Idc flowing on the direct current side DC is proportional to the power P, the ripple component oscillating with the frequency f equal to that of the three-phase alternating current emerges into the current Idc on the direct current side DC.

In the present invention, the ripple detection means 17 is installed in the direct current side DC so that the ripple component which reflects the DC offset ΔIdc included in the output current i may be detected by the ripple detection means 17.

The control section 6 generates a signal for controlling the DC offset included in the three-phase alternating current side AC based on the ripple detection signal "y" supplied by the ripple detection means 17, and, by the control signal S0 including above signal, controls the switching section 1 to compensate the DC offset ΔIdc. The compensation of the DC offset ΔIdc in the control section 6 means to reduce the DC offset ΔIdc to zero as a matter of practice. Such operation is accomplished by controlling a switching operation of the switching section 1 so that the component having the system frequency f is not included in the ripple detection signal "y" detected by the ripple detection means 17.

In the present invention, though it is necessary to install the ripple detection means 17 in the direct current side DC, all the function required for this ripple detection means 17 is merely to detect the component having the three-phase AC frequency f emerging in the direct current side DC. That is, since there is almost no effect of the error of DC offset or gain of the ripple detection means 17, a low-cost ripple detection means may be employed to reduce the cost of overall device. In addition, since the effect of temperature change and aged deterioration may be minimized, a highly reliable device may be accomplished.

Figure 4:
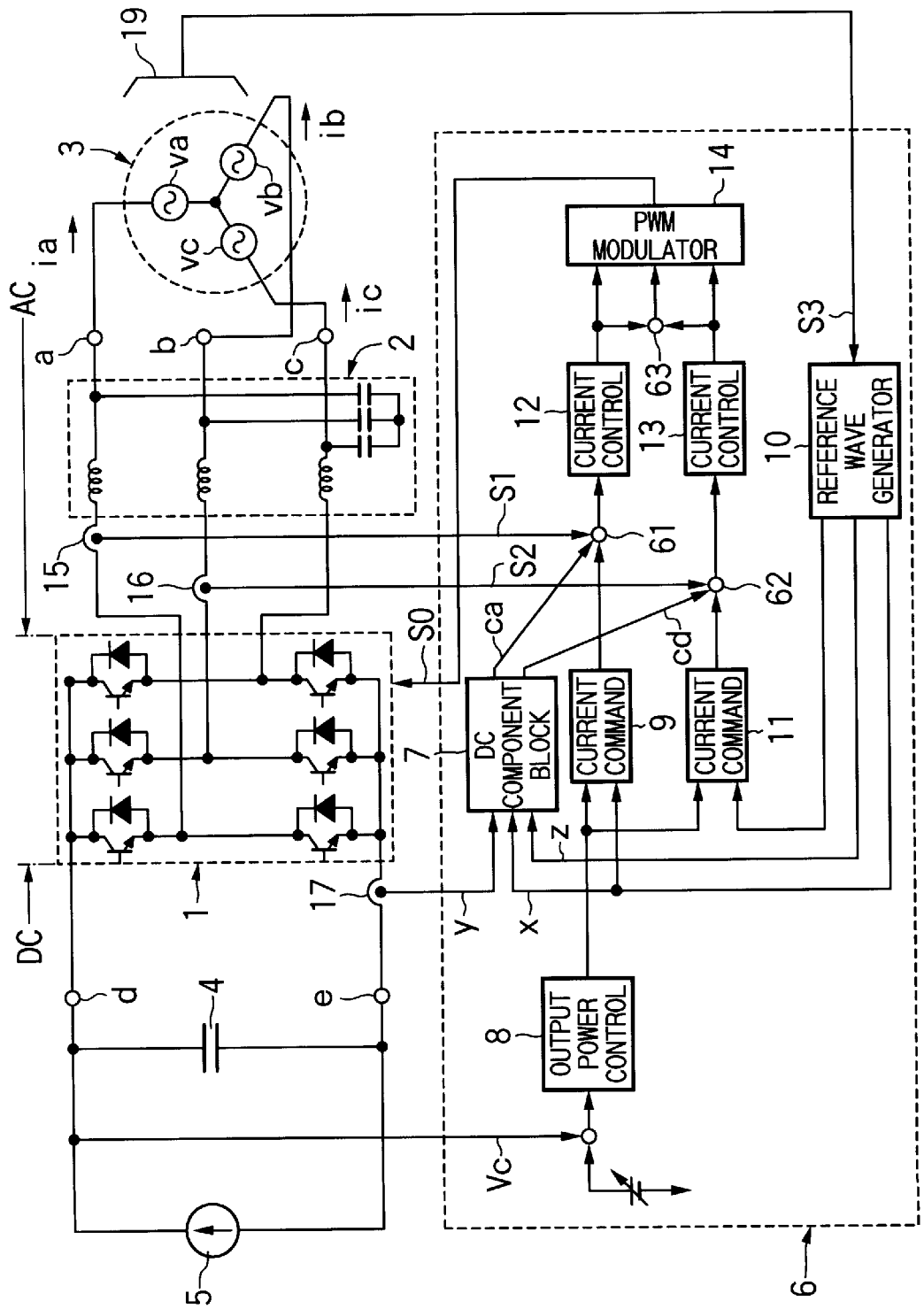
FIG. 4 is a concrete circuit diagram of the power conversion device according to an embodiment of the present invention.

FIG. 4 is a concrete circuit diagram of the power conversion device according to the present invention. The switching section 1 is composed of a full-bridge circuit using a semiconductor switching device. The filter 2 is composed of a LC filter. The control section 6 comprises an output power control section 8 for controlling AC—DC conversion power, a current command operation section 9, 11, a reference wave generator section 10, a current control section 12, 13 and a PWM modulator section 14.

The reference waveform generator section 10 is, for example, made up of a combination of PLL circuit and a data table, and is synchronized with the voltage of the three-phase AC system 3 detected by the voltage sensor 19 and operates a reference sinusoidal wave signal "x", "z" having a reference amplitude.

Since an operation of the present three-phase power conversion device is well known by, for example, POWER ELECTRONICS (Ned Mohan et al., 1989 JOHN WILEY & SONS, Inc.), detailed description of the basic operation thereof will be omitted.

Figure 5:
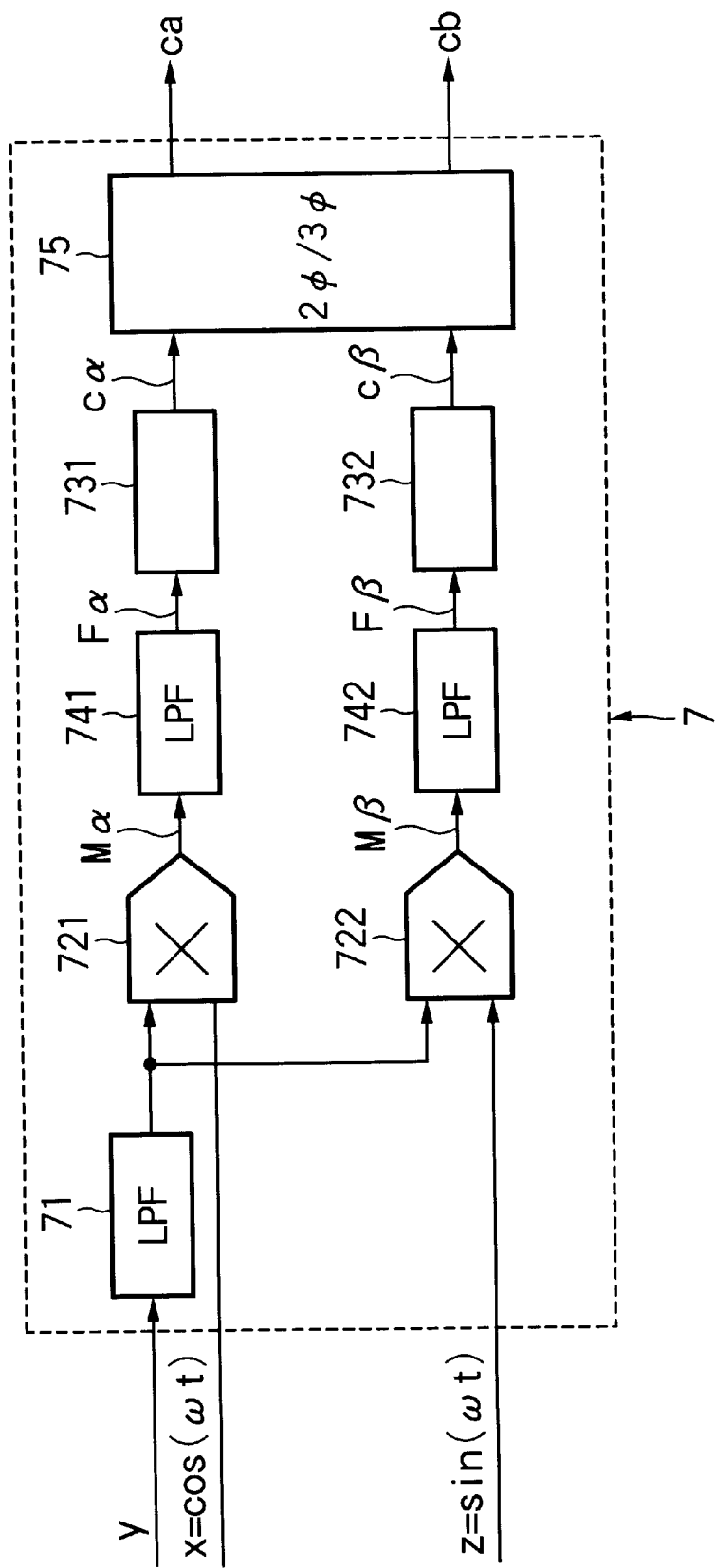
FIG. 5 is a schematic diagram of the DC component outflow blocking means included in the control section of the power conversion device of FIG. 4.

Characteristic feature of the embodiment shown in FIG. 4 is that a DC component outflow blocking means 7 is included. FIG. 5 shows a schematic constitution of the DC component outflow blocking means 7. Illustrated DC component outflow blocking means 7 comprises a filter 71, a multiplier section 721, 722, a compensation section 731, 732, a filter 741, 742, and a two-phase/three-phase conversion section 75. In the present invention, the multiplier section 721, 722, the compensation section 731, 732, and a two-phase/three-phase conversion section 75 represent a circuit constitution or a order of signal processing.

The ripple detection signal "y" from the ripple detection means 17 is input through the filter 71 into each one of the terminals of multiplier sections 721 or 722 respectively. The reference sinusoidal wave signals "x", "z" from the reference sinusoidal wave generator 10 are respectively input into respective other terminals of multiplier sections 721 or 722. The reference sinusoidal wave signals "x", "z" are sinusoidal wave signals having the same frequency f with that of the three-phase AC system and have 90 degree of phase difference therebetween. For example, the reference sinusoidal wave signal "x" may be selected as a sinusoidal wave signal synchronized with the phase voltage of the first phase (terminal "a") of the three-phase AC system and the reference sinusoidal wave signal "z" may be selected as a sinusoidal wave having 90 degree of phase lag from the reference sinusoidal wave signal "x".

The reference sinusoidal wave signals "x", "z" are generated in the reference sinusoidal wave generator section 10. The reference sinusoidal wave generator section 10 is designed to generate the reference sinusoidal wave data from the data table based on a phase synchronizing signal of the PLL circuit so that the signals may be generated by adding to the data table a sinusoidal wave data corresponding to the reference sinusoidal wave signals "x", "z".

Each of the multiplier sections 721, 722 operates a multiplication of the ripple detection signal "y" of the ripple detection means 17 and the reference sinusoidal wave signal "x" or "z". Outputs Mα, Mβ of the multiplier sections 721, 722 are respectively input into the filters 741, 7427. The filters 741, 742 may be omitted. The outputs of the filters 741, 742 are input into the compensation sections 731, 732 respectively, and the outputs of the compensation sections 731, 732 are input into the two-phase/three-phase conversion section 75 and are added to detection outputs of the current sensor 15, 16 installed in the alternating current side.

Then, an operation of the DC component outflow blocking means 7 shown in FIG. 5 will be described with reference to the waveform diagrams shown in FIGS. 6, 7. FIG. 6 shows waveform diagrams when the DC offset is not included in the output current, while FIG. 7 shows waveform diagrams when the DC offset is included in the output current.

When the high-frequency component caused by the switching operation in the switching section 1 is neglected, the output current ia–ic, and the output voltage (phase voltage) va–vc are represented as follows:

$$va = Vm \cos(\omega t)$$

$$vb = Vm \cos(\omega t - 2\pi/3)$$

$$vc = Vm \cos(\omega t - 4\pi/3) \qquad (1)$$

$$ia = Im \cos(\omega t + \theta) + Iad$$

$ib = Im \cos(\omega t + \theta - 2\pi/3) + Ibd$ $ic = Im \cos(\omega t + \theta - 4\pi/3) + Icd$ (2)

where, Vm is a maximum output phase voltage value, Im is a maximum output current value, ω is an angular frequency of the fundamental wave, and each of Iad, Ibd, Icd is the DC offset included in the output current ia–ic respectively. θ is a phase angle of the output current ia–ic.

Figure 7A:
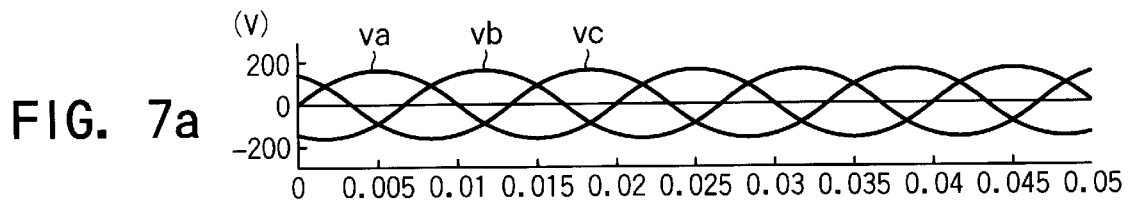
FIGS. 7(a–g) are waveform diagrams of the power conversion device of FIG. 4 when the DC offset is included in the three-phase alternating side, wherein (a) is a three-phase voltage waveform, (b) is a three-phase current waveform, (c) is a two-phase voltage waveform, (d) is a two-phase current waveform, (e) is an α-phase output power waveform, (f) is a β-phase output power waveform, and (g) is an overall power waveform.
Figure 7B:
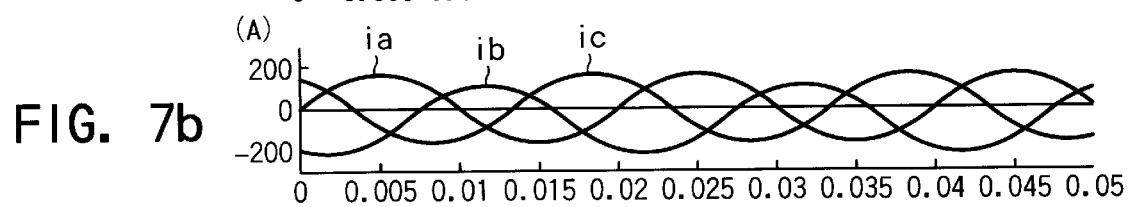

When the DC offset is not included in the output current ia–ic, Iad=Ibd=Icd=0, which gives such wave form diagrams as of FIGS. 6(a) and 6(b). A concrete example of the voltage and the current waveforms, where the DC offset is included in the output current, for example, DC offset of "a"-phase being ia=1.5 A and that of "b"-phase being ib=−3.0 A, are shown in FIGS. 7(a) and 7(b).

Figure 9A:
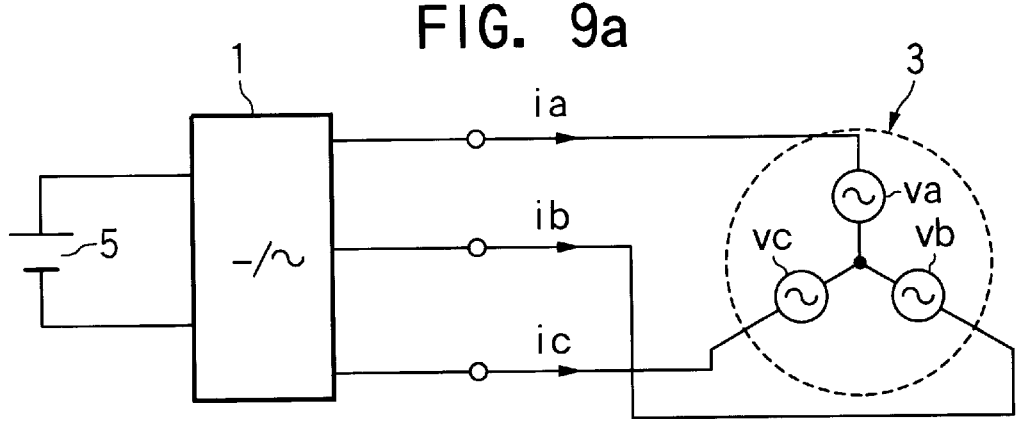
FIG. 9(a) is a circuit diagram of a fundamental circuit of the three-phase alternating current.
Figure 9B:
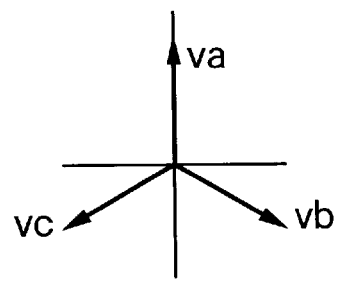
FIG. 9(b) is a vector representation of the three-phase voltage.
Figure 10A:
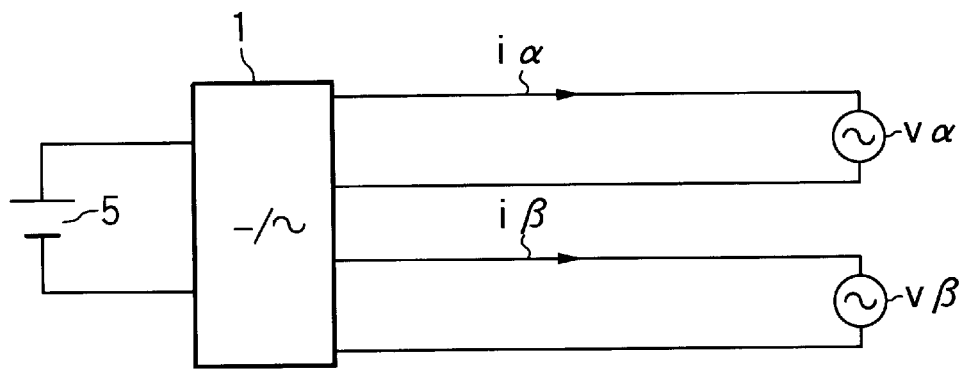
FIG. 10(a) is a circuit diagram illustrating a conversion between the three-phase alternating current of FIG. 9 and the two-phase alternating current.
Figure 10B:
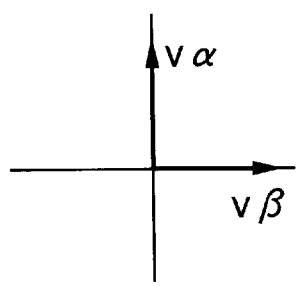
FIG. 10(b) is a vector representation of the two-phase voltage.

For analyzing an instantaneous value of the three-phase AC, a method for analyzing the three-phase AC by converting it into an equivalent two-phase AC will be applied. This analysis method is well known to persons skilled in the art. According to this analysis method, the three-phase voltage and current may be converted into those of the equivalent two-phase AC using equations (3), (4) below.

$$\begin{bmatrix} v\alpha \\ v\beta \end{bmatrix} = \sqrt{\frac{3}{2}} \begin{bmatrix} 1 & \frac{-1}{2} & \frac{-1}{2} \\ 0 & \frac{\sqrt{3}}{2} & \frac{\sqrt{3}}{2} \end{bmatrix} \begin{bmatrix} va \\ vb \\ vc \end{bmatrix} \quad (3)$$

$$\begin{bmatrix} i\alpha \\ i\beta \end{bmatrix} = \sqrt{\frac{3}{2}} \begin{bmatrix} 1 & \frac{-1}{2} & \frac{-1}{2} \\ 0 & \frac{\sqrt{3}}{2} & \frac{\sqrt{3}}{2} \end{bmatrix} \begin{bmatrix} ia \\ ib \\ ic \end{bmatrix} \quad (4)$$

where, vα, vβ, iα, and iβ are voltage and current component of respective phases when the phases of the equivalent two-phase AC are defined as α and β phases. By the conversion above, the three-phase AC shown by FIG. 9(a), or equations (1), (2) is converted as shown in FIG. 10(b) into the equivalent two-phase AC composed of components vα, vβ having 90 degree of phase difference therebetween.

Figure 7C:
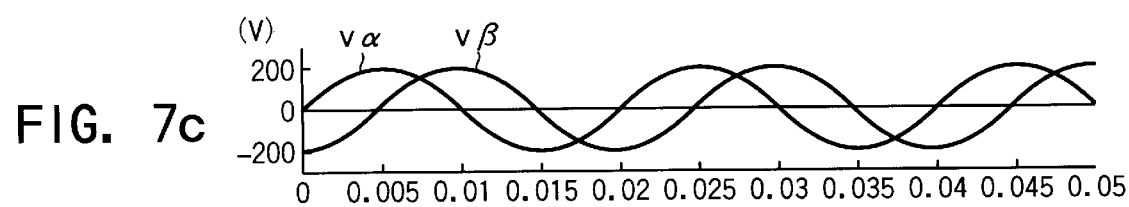
Figure 7D:
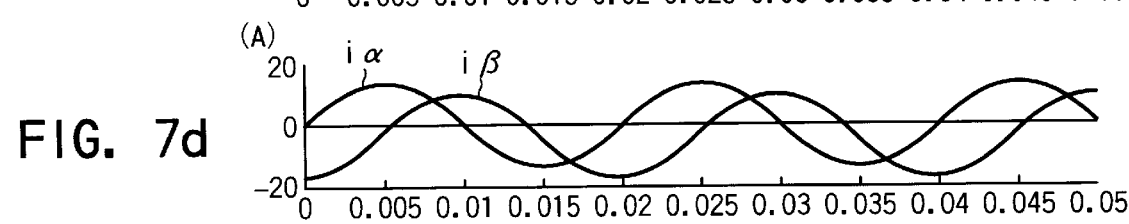
Figure 7E:
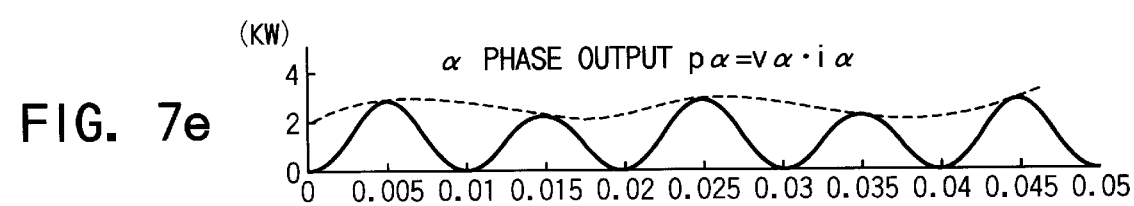
Figure 7F:
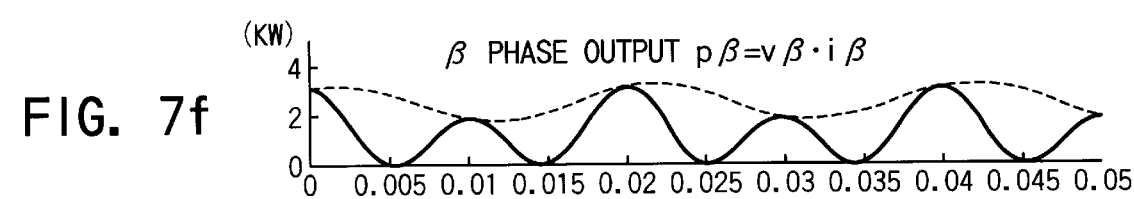

The waveforms of two-phase voltage vα, vβ and of two-phase current iα, iβ are shown in FIGS. 6(c), 6(d) for the case including no DC offset as well as in FIGS. 7(c), 7(d) for the case including DC offset. In the current waveform diagram of FIG. 7(d), the DC offset is included in each current iα, iβ, which means that the DC offset included in the three-phase AC is converted into equivalent two-phase DC offset in the equivalent two-phase AC model. When the voltage and the current shown by equations (1), (2) are converted into the two-phase voltage and current using the equations (3), (4), they are represented by the equations below.

$$\begin{bmatrix} v\alpha \\ v\beta \end{bmatrix} = \sqrt{\frac{3}{2}} \begin{bmatrix} Vm \cos(\omega t) \\ Vm \sin(\omega t) \end{bmatrix} \quad (5)$$

$$\begin{bmatrix} i\alpha \\ i\beta \end{bmatrix} = \sqrt{\frac{3}{2}} \begin{bmatrix} Im \cos(\omega t) + \underline{Iad} \\ Im \sin(\omega t) + \underline{\sqrt{\frac{1}{3}} Iad + \sqrt{\frac{1}{3}} Ibd} \end{bmatrix} \quad (6)$$

wherein, underlined terms indicate the DC offset on the equivalent two-phase AC.

An instantaneous value p of the output power on the two-phase AC is represented by the equation below:

$p = v\alpha \cdot i\alpha + v\beta \cdot i\beta$ (7)

That is, the output power p is represented by summation of the output power of the α-phase (vα*iα) and that of β-phase (vβ*iβ) of the two-phase AC.

Figure 7G:
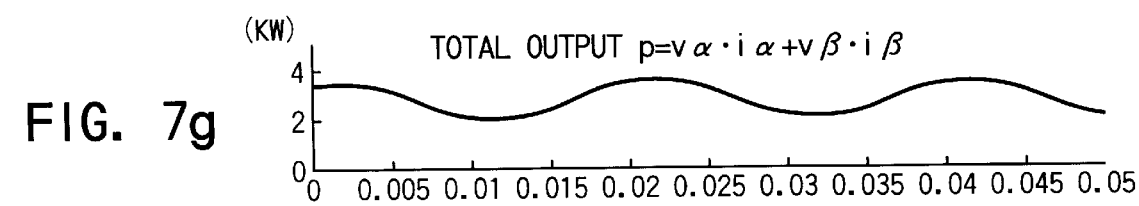

FIGS. 6(e), 6(f) and FIGS. 7(e), 7(f) show the instantaneous output power waveforms of α- and β-phases of the equivalent two-phase AC, and FIGS. 6(g), 7(g) show the instantaneous waveforms of total output powers.

In the waveform diagrams of FIG. 6, which include no DC offset, each output power of α- and β-phases is observed as a waveform in which on a mean output power (DC component) is superimposed a ripple component having a frequency twice as much as AC frequency f of the three-phase AC. Since the ripple components which are included in the α- and β-phase output powers and have a frequency 2f twice as much as AC frequency f of the three-phase AC have 180 degree of phase difference respectively, the total output power is composed of the DC component only (see FIG. 6(f)).

In the waveform diagrams of FIG. 7, where the output current includes the DC offset, each output power of α- and β-phases is composed of the mean output power (DC component), the component having a frequency 2f twice as much as AC frequency f of the three-phase AC, and, in addition to those, the ripple component having the same frequency f with that of the three-phase AC is superimposed thereon. As is obvious from the waveform diagrams of FIG. 7 or equations (5), (6), and (7), a component "a" having the same frequency with the three-phase AC frequency f has the same phase with that of the α-phase voltage, and a component "b" has the same phase with that of the β-phase voltage waveform. In addition, since the DC offset included in the β-phase has a negative polarity, the phase thereof is inverted by 180 degrees. When the DC offset is included in the output power, the α-phase output power is represented by:

$$pa = v\alpha * i\alpha \quad (8)$$
$$= (3/4)Vm*Im*\cos(\theta) + (3/4)Vm*Im*\cos(2\omega t + \theta) +$$
$$\underline{(3/2)Vm*Im*\cos(\omega t)}$$

and the β-phase output power is represented by:

$$pb = v\beta * i\beta \quad (9)$$
$$= (3/4)Vm*Im*\cos(\theta) + (3/4)Vm*Im*\cos(2\omega t + \theta) +$$
$$\underline{\left(\sqrt{3/2}\right)Vm*(Iad + Ibd)*\sin(\omega t)}$$

and then the total output power is represented by:

$$p = (3/2)Vm*Im*\cos(\theta) + \quad (10)$$
$$(3/2)Vm*Iad*\cos(\omega t) + (3/2)Vm*(Iad + Ibd)*\sin(\omega t)$$

The third terms of the above equations (8), (9), which are underlined, correspond to the DC offset having the same frequency f with that of the three-phase AC.

Since the instantaneous waveform of the total output power is represented by the summation of above equations (8) and (9), the ripple having the same frequency f with that of the three-phase AC is included therein, so that a resultant power (underlined part of equation (10)) of the ripple component included in α-phase and that in β-phase is superimposed on the power as shown in FIG. 7(g).

The DC outflow blocking means 7 of the present invention compensates the DC offset included in the output current by the use of above described characteristics. That is, the ripple component having the same frequency f with that of the three-phase AC included in the output current is detected, and then, based on the amplitude and the phase of this ripple component, the DC offset of the three-phase AC is compensated.

When the smoothing capacitor 4 has sufficient capacity and a terminal voltage Vc thereof is DC voltage with little ripple, the current waveform flowing on the direct current side DC is proportional to the output power waveform, and, to take advantage of this fact, the ripple detection means 17 composed of current detection element is installed in the direct current side of the switching section 1 to measure the DC input current by the ripple detection means 17. Thereby the ripple component of current having the same frequency with the fundamental frequency f of the three-phase AC can be detected.

In FIG. 5, the filter 71 removes high-frequency noise caused by the switching operation of the switching section 1 and extracts the low-frequency component near to the fundamental wave frequency of three-phase AC frequency f included in the output power.

Then the multiplier section 721, 722 once analyzes the component having the same frequency with the three-phase AC frequency f, which is the output of the filter 71, into α- and β-phase signals. The input signal "y" into the DC component outflow blocking means 7 is proportional to the total output power p (see equation 10). That is, $$y = kl * p$$
$$= kl * \{(3/2)Vm * Im * \cos(\theta) + (3/2)Vm * Iad * \cos(\omega t) +$$
$$(3/2)Vm * (Iad + Ibd) * \sin(\omega t)\}$$

where, the reference wave signals "x", "z" are given by:

$$x = \cos(\omega t)$$
$$y = \sin(\omega t)$$

The output Mα of the multiplier section 721 is represented as:

$$M\alpha = y * x \qquad (11)$$
$$= kl\{(3/2)Vm * Im * \cos(\theta) + (3/2)Vm * Iad * \cos(\omega t) +$$
$$(3/2)Vm * (Iad + Ibd) * \sin(\omega t)\}\cos(\omega t)$$
$$= (3/2)kl * Vm * Im\{(1/2)\cos(\omega t - \theta) + (1/2)\cos(\omega t + \theta)\} +$$
$$(3/2)kl * Vm * Iad * \{1/2 + (1/2) * \cos(2\omega t) +$$
$$\left(\sqrt{3/2}\right)kl * Vm * (Iad + Ibd) * (1/2) * \sin(2\omega t)\}$$

The output Mβ of the multiplier section 722 is represented as:

$$M\beta = y * z \qquad (12)$$
$$= kl\{(3/2)Vm * Im * \cos(\theta) + (3/2)Vm * Iad * \cos(\omega t) +$$
$$(3/2)Vm * (Iad + Ibd) * \sin(\omega t)\}\sin(\omega t)$$
$$= (3/2)kl * Vm * Im * \cos(\theta)\sin(\omega t) +$$
$$(3/2)kl * Vm * Iad * (1/2)\sin(2\omega t) +$$
$$\left(\sqrt{3/2}\right)kl * Vm * (Iad + Ibd) * \{1/2 - \cos(2\omega t)\}$$

The output Mα, Mβ of the multiplier 721, 722 includes, other than the necessary DC components, unnecessary component of three-phase AC frequency f and the ripple component having a frequency twice as much as the three-phase AC frequency f. The filter 741, 742 has a role to remove the frequency components having the same or the twice as much frequency of the three-phase AC frequency f.

As a result, only the DC components of the equation (11), (12) are left in the output of the filter 741, 742. They are represented by equations (13),(14) below. That is, the outputs Fα, Fβ of the filters 741, 742 are respectively represented as:

$$F\alpha = (3/4)kl * Vm * Iad \qquad (13)$$
$$= \left(\sqrt{3/2}\,\sqrt{2}\right)kl * Vm * x\left(\sqrt{3}\,/\,\sqrt{2}\right)Iad$$

$$F\beta = \left(\sqrt{3/4}\right)kl * Vm * (Iad + Ibd) \qquad (14)$$
$$= \left(\sqrt{3/2}\,\sqrt{2}\right)kl * Vm * x\left(1/\sqrt{2}\right)(Iad + Ibd)$$

When comparing equation (13), (14) with equation (6), it is found that there is a proportional relation between the underlined part (DC components) of equation (13), (14) and the underlined part (DC components) of equation (6). That is, the output Fα, Fβ of the filter 741, 742 is proportional to the DC component of the equivalent two-phase AC system (underlined part of equation (6)). Accordingly, when the output Fα, Fβ of the filter 741, 742 is decreased to zero, the DC offset included in the three-phase AC becomes zero. The compensation section 731, 732 operates the compensation signal to make the output Fα, Fβ of the filter 741, 742 zero.

The compensation section 731, 732 is preferably provided with an element of integrating function, and when it has an integrator or a proportional-integrator, a steady-state direct current may be theoretically reduced to zero. In addition, when the integrator or the proportional-integrator is selected as a compensation section 731, 732, it has an inherent characteristic as a low pass filter which provides high gain for the low frequency component and low gain for high frequency component, so that the filter 741, 742 may be omitted to make the system simple.

Since a compensation signal cα, cβ operated by the compensation section 731, 732 is that for the two-phase AC system, in order to obtain the compensation signal for an actual three-phase AC signal, the phase conversion section 75 performs two-phase/three-phase conversion to generate a three-phase compensation signal. A conversion equation is shown as equation (15) below.

$$\begin{bmatrix} Ca \\ Cb \\ Cc \end{bmatrix} = \sqrt{\frac{2}{3}} \begin{bmatrix} 1 & 0 \\ -\frac{1}{2} & \frac{\sqrt{3}}{2} \\ -\frac{1}{2} & \frac{\sqrt{3}}{2} \end{bmatrix} \begin{bmatrix} C\alpha \\ C\beta \end{bmatrix} \qquad (15)$$

In equation (15), each of compensation signals Ca, Cb, Cc is an three-phase compensation signal converted from the two-phase compensation signal cα, cβ. In the three-phase AC, when the condition of two phases out of three phases is determined, the condition of the last phase is automatically determined, so that, among three compensation signals Ca, Cb and Cc, only two compensation signals, for example, Ca and Cb may be operated on the actual circuit.

The compensation signal Ca, Cb converted by the phase conversion section 75 is, as shown in FIG. 4, added with reverse polarity to the output S1, S2 of the current sensor 15, 16 by an adder section 61, 62. Thereby, the DC offset is compensated.

Figure 8A:
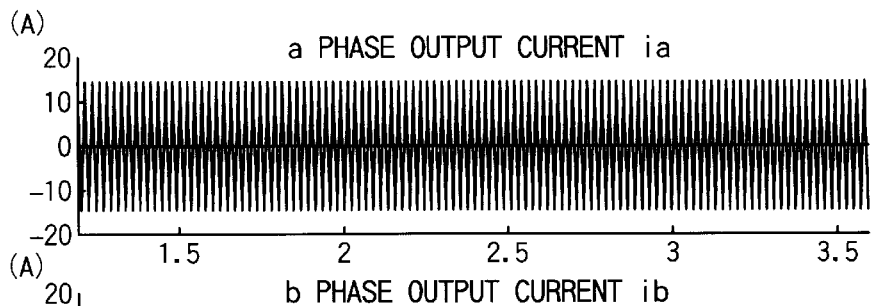
FIGS. 8(a–e) are waveform diagrams of the power conversion device of FIG. 4 when the DC offset is included in the three-phase alternating side, wherein (a) is an a-phase output current waveform, (b) is a b-phase output current waveform, (c) is an output power waveform, (d) is a compensation signal waveform, and (e) is an offset compensation error waveform.
Figure 8B:
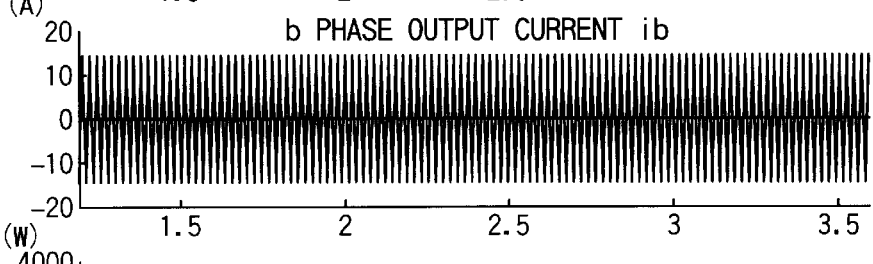
Figure 8C:
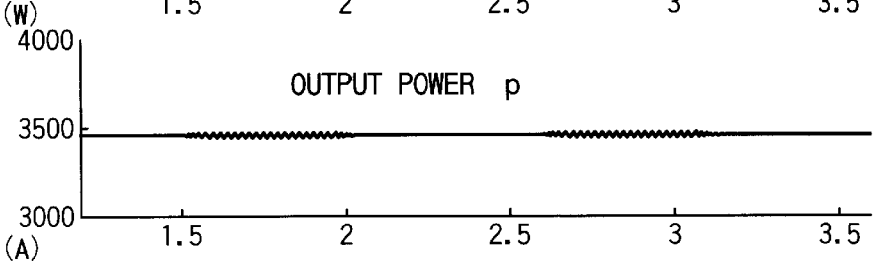
Figure 8D:
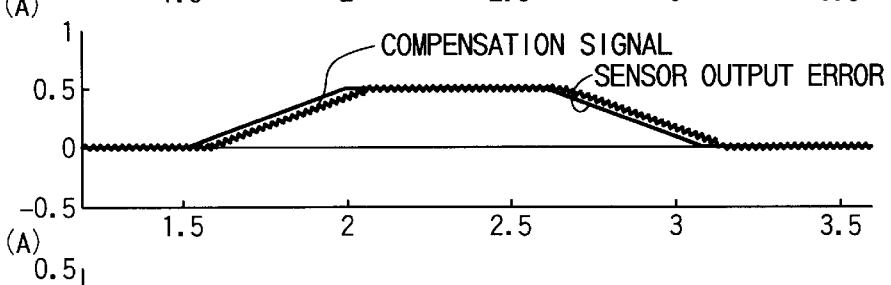
Figure 8E:
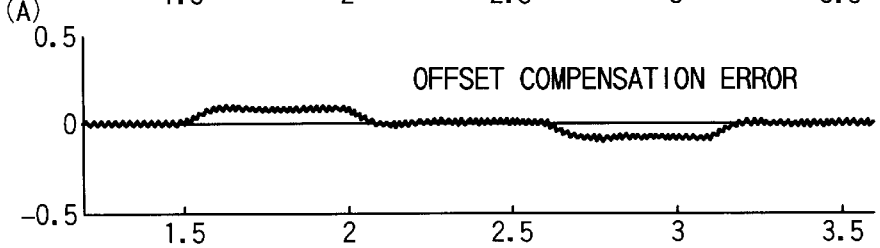

FIG. 8 shows compensation operation of the power conversion device of FIG. 4 when the DC offset is included in the three-phase AC side, wherein FIG. 8(a) is an a-phase output current waveform, FIG. 8(b) is a b-phase output current waveform, FIG. 8(c) is an output power waveform, FIG. 8(d) is a compensation signal waveform, and FIG. 8(e) is an offset compensation error waveform. In case of FIG. 8, there occurs 0.5 A of transient DC offset on a path from the a-phase to the c-phase due to an external disturbance such as an output error of the current sensor (see FIG. 8(d)). Referring to FIG. 8(d), the compensation signal is operated based on this DC offset. When the DC offset varies along the time, the compensation signal follows it. Since the compensation signal is added with reverse polarity to the current sensor output S1, S2 (see FIG. 4), even if there occurs the DC offset on the current sensor due to the external disturbance or the like, such effect can be surely cancelled to generate the output current including no DC offset.

In the present invention, though it is necessary to install the ripple detection means 17 in the direct current side DC, all the function required for this ripple detection means 17 is merely to detect a component of fundamental frequency f. That is, since there is almost no effect of the error of DC offset or gain of the current sensor, a low-cost sensor may be employed to reduce the cost of overall system, and, at the same time, the effect of temperature change and aged deterioration may be minimized to improve reliability. In addition, since the DC offset of the output current is adjusted while observing the component with specific frequency included in the direct current side, not only an effect of the DC offset or the drift of the current sensor but also the DC offset or the drift of the filter and peripheral circuits such as A/D converter circuit, D/A converter circuit or the like may be integrally compensated and thereby any characteristics of these peripheral circuits have no effect. Accordingly, even if cheep or simple elements and circuits are used in the peripheral circuits, the DC offset may be accurately compensated, so that the reliability may be improved more as well as the cost may be reduced.

Especially in the special usage requiring high-speed, safety and more reliability, the DC offset included in the AC output current may be controlled more effectively when the present method and the conventional one in which the operation is performed while compensating the DC offset of the current sensor installed in the alternating current side are used at the same time.

Figure 11:
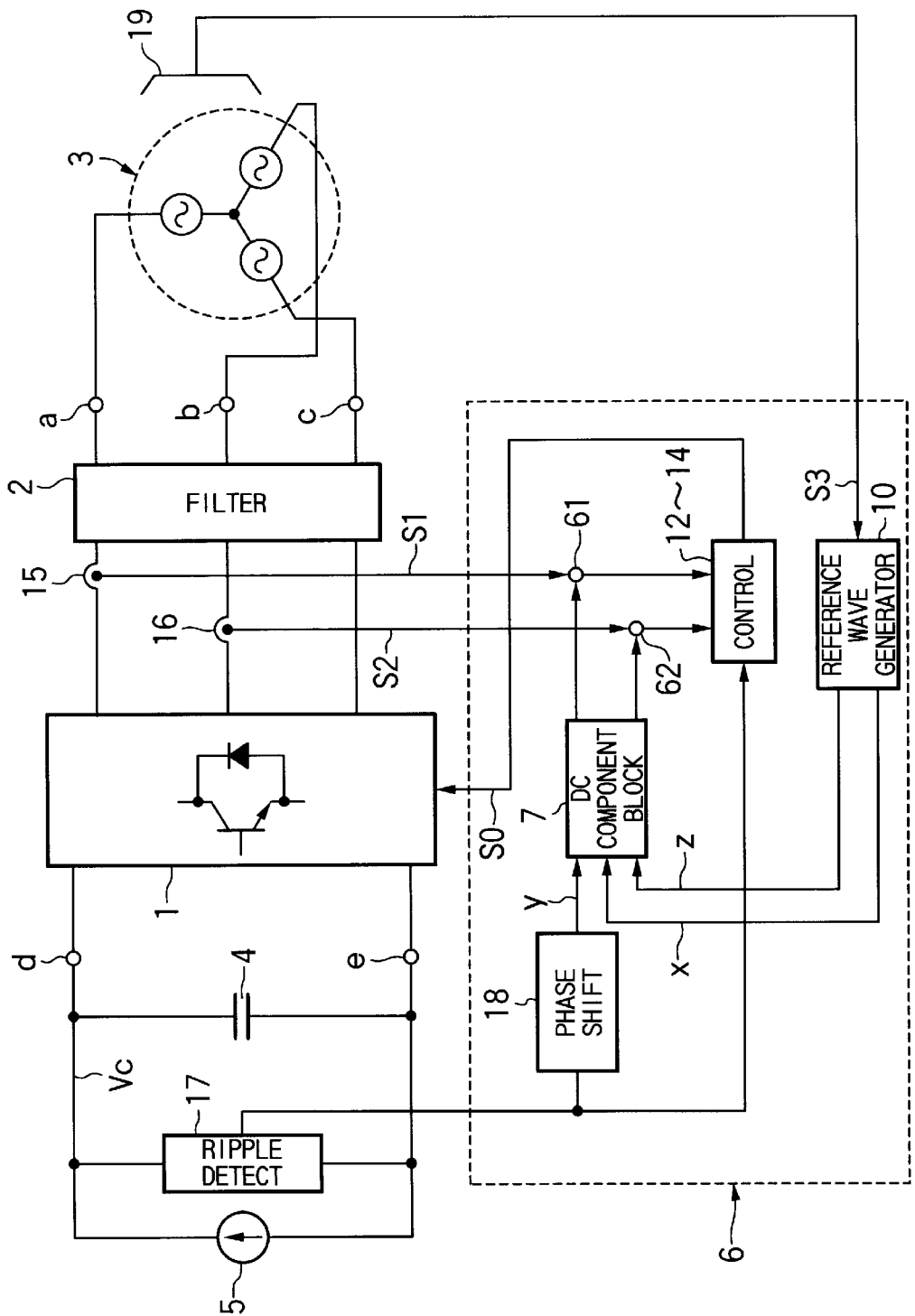
FIG. 11 is a block diagram of another embodiment of the power conversion device according to the present invention.

FIG. 11 is a block diagram of another embodiment of the power conversion device according to the present invention. This embodiment shows a circuit diagram which is employable when the capacity of smoothing capacitor 4 installed in the direct current side DC is small. When the capacity of smoothing capacitor 4 is small, corresponding to the DC offset included in the three-phase alternating current side AC, the ripple component oscillating with the three-phase AC frequency f emerges in the terminal voltage Vc. Accordingly, when the capacity of smoothing capacitor 4 is small, the voltage sensor may be used as the ripple detection means 17.

The voltage signal detected by the voltage sensor 17 is sent to a phase shifting means 18. The phase shifting means 18 shifts the phase of the ripple component oscillating with the three-phase AC frequency f by 90 degree. The output signal of the phase shifting means 18 is sent to the DC component outflow blocking means 7 to perform the offset compensation operation described above. When the reference sinusoidal waves "x" and "z" to be sent to the DC component outflow blocking means 7 are exchanged each other to adjust the polarity in advance based on the fact that the ripple voltage included in the terminal voltage Vc of the smoothing capacitor 4 has 90 degrees of phase lag, the phase shifting means 18 may be omitted.

Figure 12:
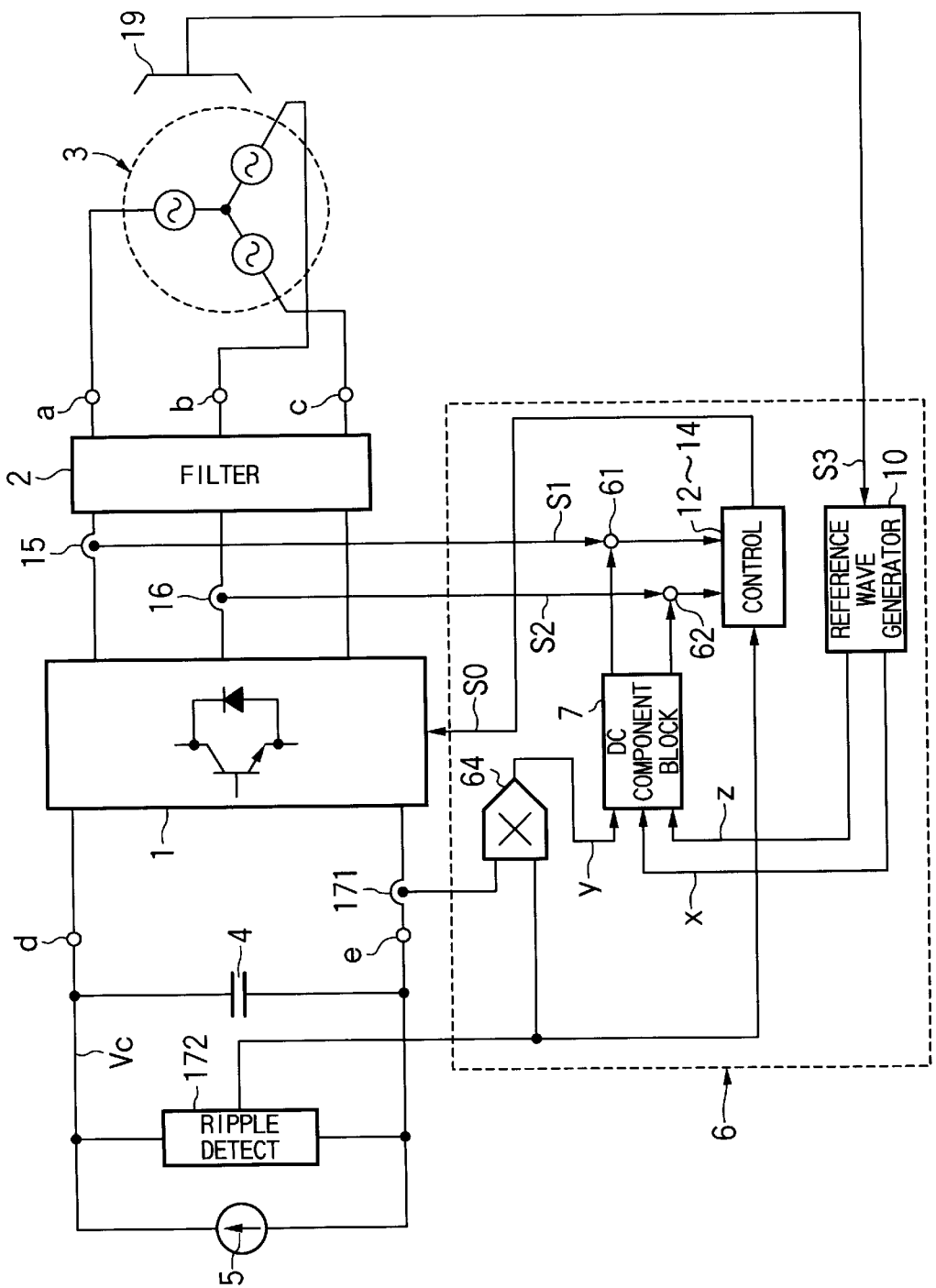
FIG. 12 is a block diagram of another embodiment of the power conversion device according to the present invention.

FIG. 12 is a block diagram of another embodiment of the power conversion device according to the present invention. In this embodiment, a first ripple detection means 171 made of ripple detection element and a second ripple detection means 172 made of voltage sensor are included. An operation section 64 multiplies the ripple detection signal output from the first ripple detection means 171 by the voltage detection signal output from the second ripple detection means 172 to operate the power. Then the multiplied signal is sent to the DC component outflow blocking means 7 to compensate the DC component outflow.

The present invention may be applied to the converter device having similar working principle, for example, sinusoidal wave input type AC/DC converter, or active filter. The example thereof will be described below.

Figure 13:
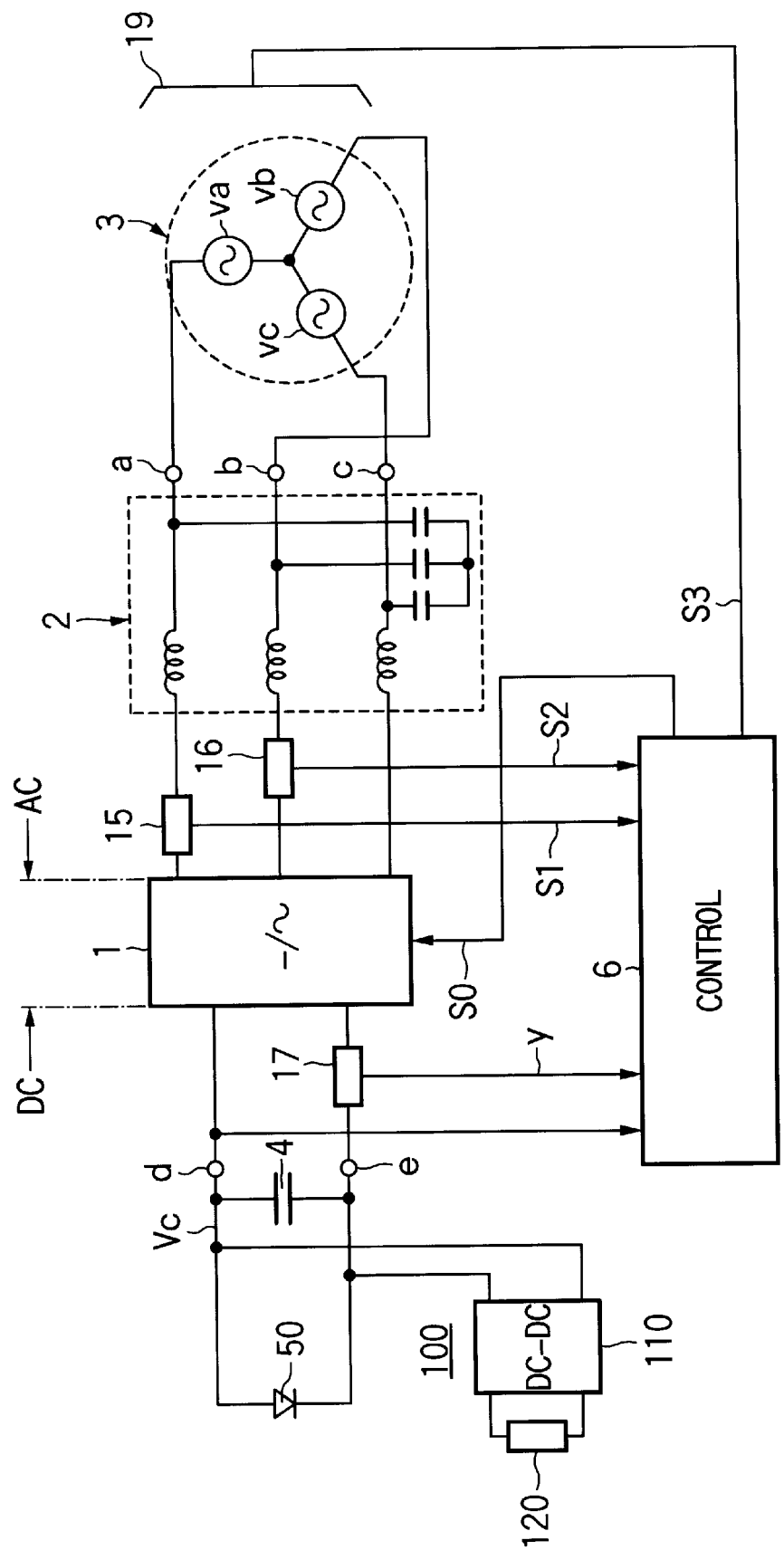
FIG. 13 is a block diagram of another embodiment of the power conversion device according to the present invention.

FIG. 13 is a block diagram of still another embodiment of the power conversion device according to the present invention. In the drawing, the same components with the FIG. 1 are shown by the same reference numerals. In this embodiment, a DC power generation source 50 and a direct current type loading 100 are disposed in the direct current side DC. The DC power generation source 50 may comprise, for example, a photovoltaic solar generation source, and the DC type loading 100 is shown as a circuit comprising a DC—DC converter 110 and a resistor 120. The resistor 120 is optional. The circuit constitution of the DC type loading 100 is not limited to that shown in this embodiment. For example, the DC type loading without the DC-DC converter 110 may be employed. Other part of the constitution is the same with those described with reference to FIGS. 1, 4 and 5, and performs the similar operation and processing also.

That is, the power generated by the DC power generation source 50 is supplied to the switching section 1 as well as to the DC type loading 100. The switching section 1 performs switching of the direct current supplied by the DC power generation source 50 and the smoothing capacitor 4 to output to the three-phase alternating current side AC.

The control section 6 generates a signal for controlling the DC offset included in the three-phase alternating current side AC based on the ripple detection signal "y" supplied by the ripple detection means 17. The control section 6 controls the switching section 1 by the control signal S0 including this signal to compensate the DC offset included in the three-phase alternating current side AC. The compensation of the DC offset is accomplished by controlling the switching operation of the switching section 1 so that the component of the three-phase AC frequency f may not be included in the ripple detection signal detected by the ripple detection means 17.

Figure 14:
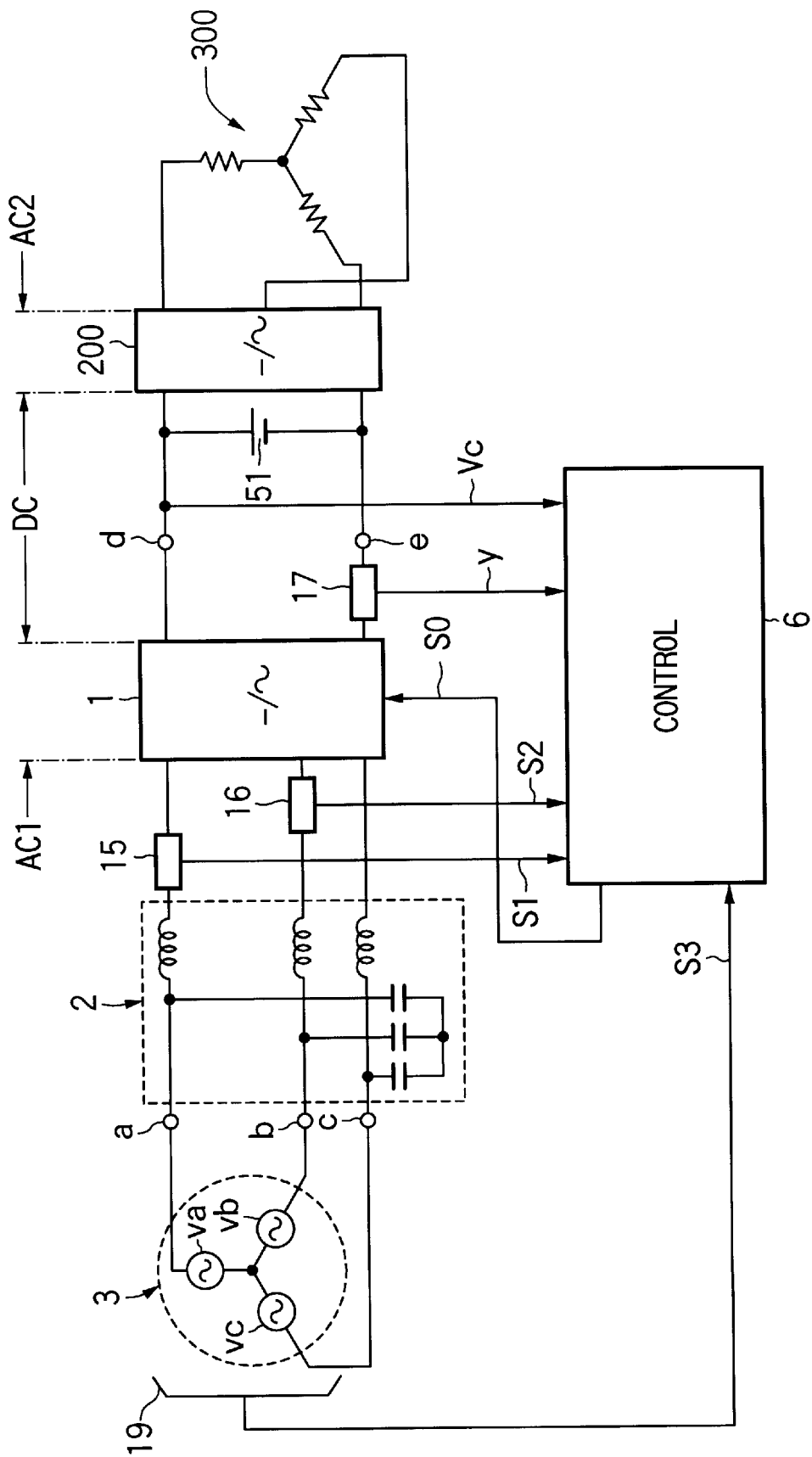
FIG. 14 is a block diagram of another embodiment of the power conversion device according to the present invention.

FIG. 14 is a block diagram of still another embodiment of the power conversion device according to the present invention. In the drawing, the same components with those of FIG. 1 are shown by the same reference numerals. The present embodiment shown in the drawing is a power conversion device used as an uninterruptible power supply unit. The switching section 1 serves as an AC—DC converter for converting the three-phase AC system 3 into direct current by switching. The electric power converted into DC power by the switching section 1 is used for charging a DC power source 51 composed of secondary battery or the like, and, at the same time, is converted, for example, into the three-phase AC power by a DC—AC inverter 200 to be supplied to a three-phase type loading 300.

When the three-phase AC system fails, an energy accumulated in the DC power source 51 is converted into the three-phase alternating current by the DC—AC inverter 200 to be supplied to the three-phase type loading 300.

The present embodiment is the same with the above-described embodiment in the points that the ripple detection means 17 is installed in the direct current side DC, and that the control section 6 performs DC component outflow blocking operation. That is, the control section 6 generates a signal for controlling the DC offset included in the three-phase alternating current side AC1 based on the ripple detection signal "y" supplied by the ripple detection means 17. Then, the control section 6 controls the switching section 1 by the control signal S0 including this signal to compensate the DC offset included in the three-phase alternating current side AC1.

Figure 15:
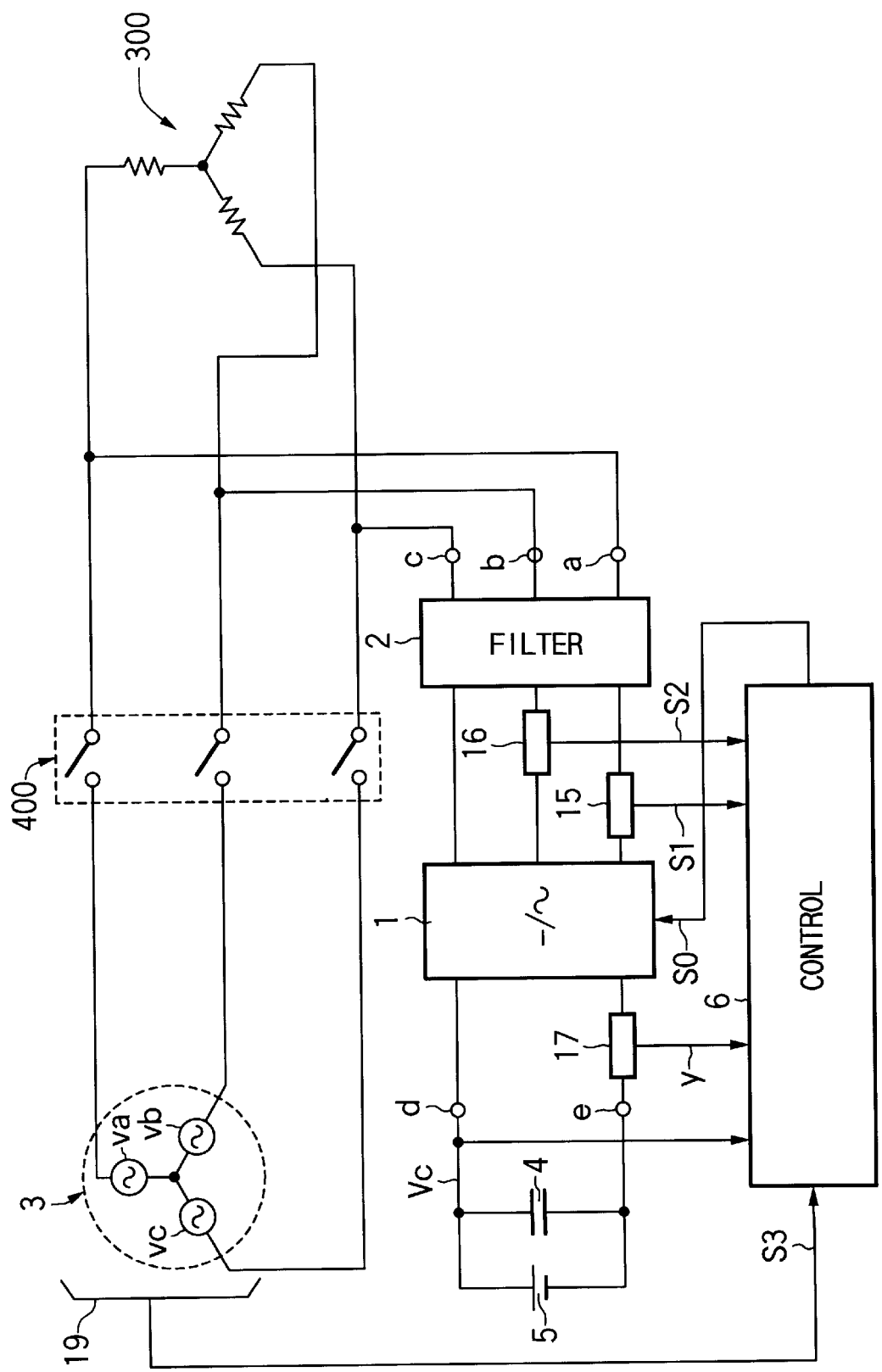
FIG. 15 is a block diagram of another embodiment of the power conversion device according to the present invention.

FIG. 15 is a block diagram of still another embodiment of the power conversion device according to the present invention. In the drawing, the same components with those of FIG. 1 are shown by the same reference numerals. The present embodiment shown in the drawing is a power conversion device used as an uninterruptible power supply unit. The three-phase AC system 3 is connected to the three-phase type loading 300 through a service interruption detection switch 400. The service interruption detection switch 400 is turned open when the three-phase AC system fails.

A three-phase AC connecting section a–c of the power conversion device is disposed in a downstream side of the service interruption detection switch 400 and connected to the three-phase system at the upstream side of the three-phase type loading 300, and, when the three-phase AC system 3 fails, instead of the three-phase AC system 3, it supply the electric power to the three-phase type loading 300. The power conversion system may employ any circuit constitutions described with reference to FIGS. 1–12.

Figure 16:
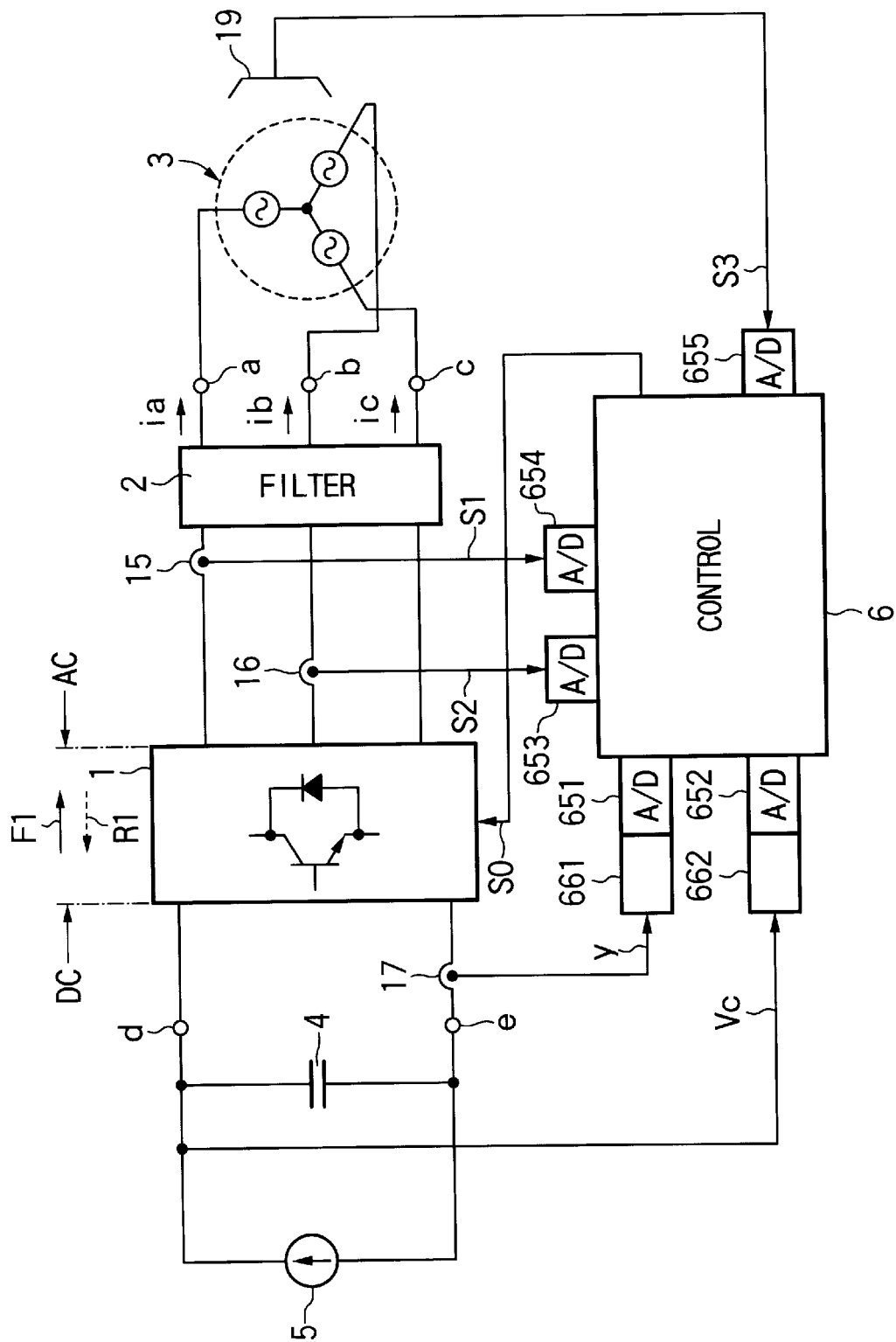
FIG. 16 is a block diagram of another embodiment of the power conversion device according to the present invention.

In the power conversion device according to the present invention, the control section 6 may be made up of digital processing device. When the control section 6 is a digital processing device, DSP (digital signal processor) may be used for it. Otherwise, a computer may be employed. FIG. 16 shows an example of power conversion device having a control section 6 made up of digital processing device. In the drawing, the same components with those of FIG. 1 are shown by the same reference numerals. In the control section 6, analogue-digital converters (hereafter, each will be referred to as A/D converter) 651–655 are installed on the input terminals of the detection signals S1–S3, "y", and Vc. When the A/D converters 651–655 are installed in the control section, they may be omitted.

Since, in the ripple component detection signal "y", a ripple frequency component is important, a filter 661 for extracting a ripple component is disposed on the upstream side of the A/D converter 651. When the ripple component of the terminal voltage Vc of the smoothing capacitor 4 is detected, the same kind of filter 662 is disposed on the upstream side of the A/D converter 652.

Figure 17:
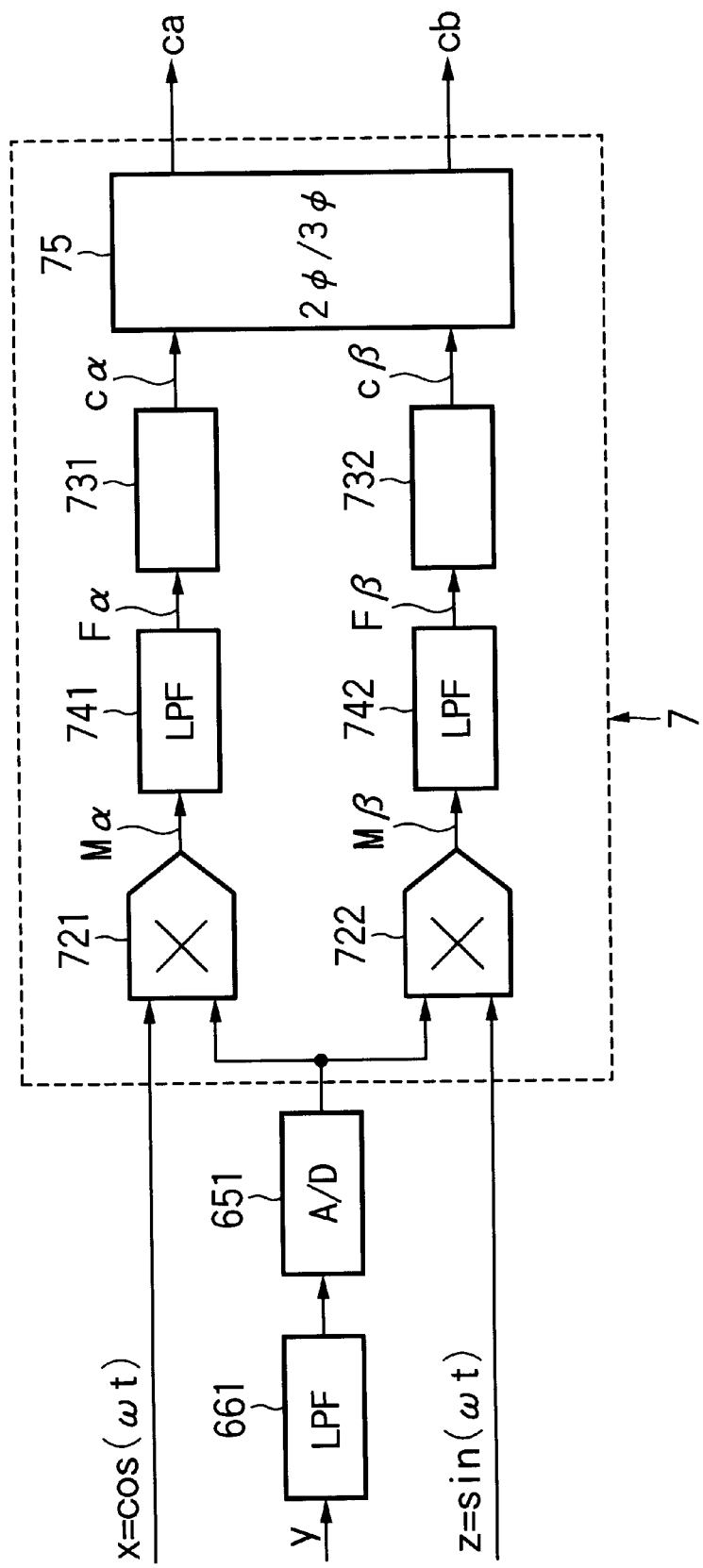
FIG. 17 is a schematic diagram of the DC component outflow blocking means used in the power conversion device of FIG. 16.

FIG. 17 is a schematic diagram of the DC component outflow blocking means 7. In FIG. 17, components shown by the same reference numerals with those of FIG. 5 perform the same processing. This differs from FIG. 5 in the point that the ripple detection signal "y" is extracted by the filter 661 and then is supplied to the A/D converter 651 to be converted into the digital signal, and the obtained digital signal is input into each one of the input terminals of the multipliers 721, 722. The fact that each part of the DC component outflow blocking means 7 performs the digital processing differs also from the case of the DC component outflow blocking means 7 shown in FIG. 5.

In an analogue system, when there exists error such as DC offset in the reference sinusoidal wave "x", "z" or in the multiplier 721, 722, there may occur an error in the compensation signal. Using a digital processing solves this problem completely. Especially in the system interconnection inverter device with a digital-type control device, only necessary matter is to modify software slightly.

Most of other part included in the control section 6 is composed of DSP or the like and performs digital processing. In concrete, for example in FIG. 4, all of the output power control section 8, the current command operation section 9, 11, the reference wave generator section 10, the current control section 12, 13 and the PWM modulator section 14 perform digital processing. When the control section 6 is made up of the computer, it may also be illustrated fundamentally by the block diagram shown in FIG. 15.

As described above, according to the embodiments of the present invention, there are provided the effects below:

(a) the power conversion device which can prevent occurrence of the DC offset in the three-phase AC system may be provided;

(b) since the low-cost ripple detection means may be used, the power conversion device which allows overall system cost to be reduced may be provided; and (c) highly reliable power conversion device which can minimize the effects of the temperature change and the aged deterioration may be provided.

Figure 18:
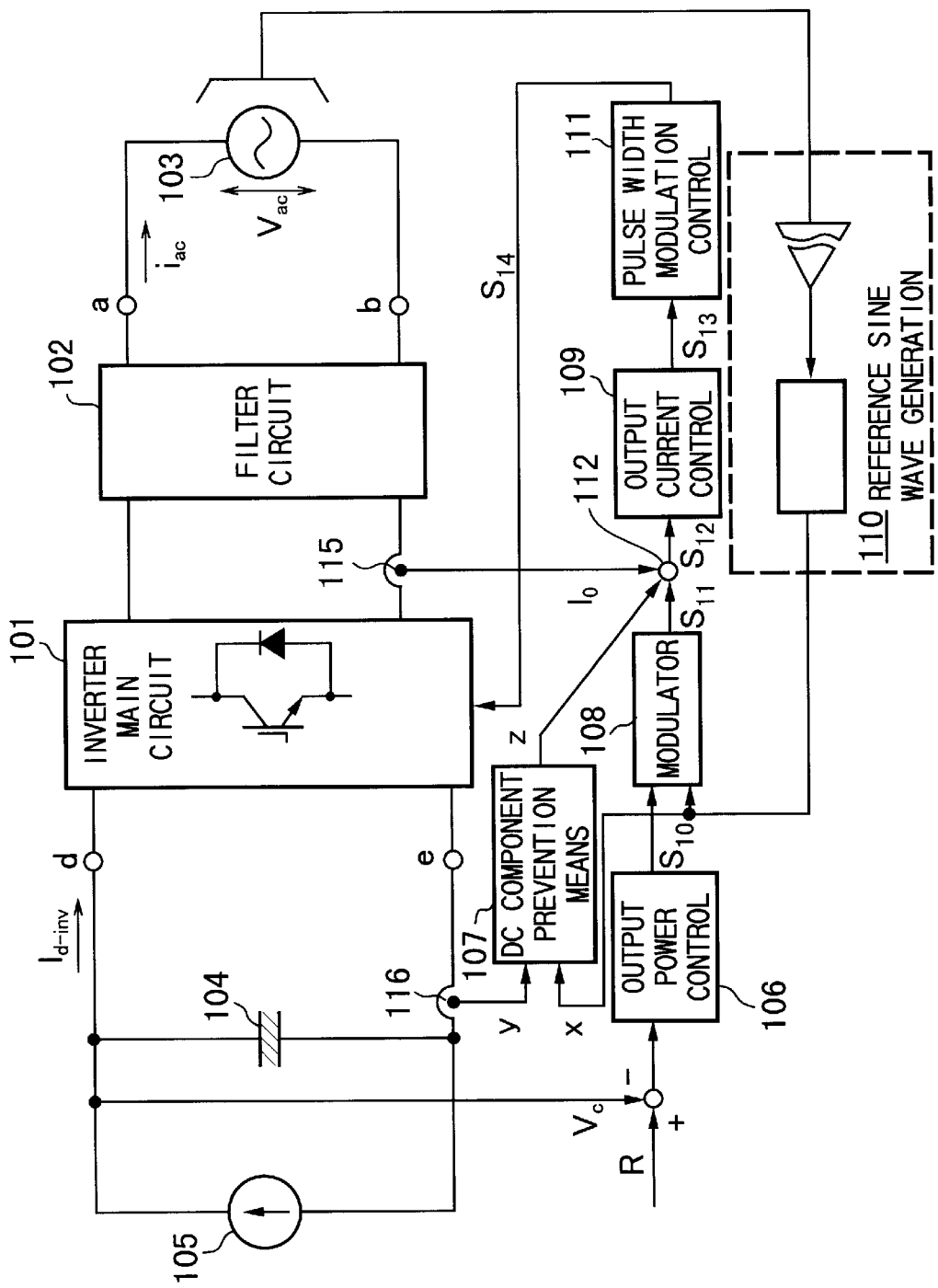
FIG. 18 is an overall block diagram of the inverter device illustrating another embodiment of the present invention.

FIG. 18 shows an example of inverter device to which the present invention is applied. The inverter according to the present invention is provided with an inverter main circuit 101. An output of the inverter main circuit 101 is connected to output terminals "a", "b" through a filter circuit 102 and the terminals "a", "b" are connected to an AC power source system 103 such as commercial AC power source.

In an input side of the inverter main circuit 101 is installed a capacitor 104 connected to a DC power generation source 105, and, to each end of the capacitor 104, input terminals "d", "e" of the inverter maincircuit 101 are connected respectively. The inverter main circuit 101 may employ any types of inverter including non-insulation type inverter such as full-bridge type inverter, half-bridge type inverter or NPC inverter, and insulation type inverter.

The inverter main circuit 101 applies a switching operation to a terminal voltage of the capacitor 104 and outputs it to the AC power source system 103 through the filter 102. This inverter device is provided with an output power control means 106 for controlling the output power. A difference signal defined by difference between an operation reference voltage command signal R for determining an operation reference voltage and the terminal voltage Vc of the capacitor 104 are input into the output power control means 106, and the output power control means 106 operates the output power based on the difference signal and generates an output power command signal $S_{10}$. Under the condition of constant power factor, the output power command signal $S_{10}$ which is an output of this output power control means 106 gives a command value of an amplitude of the output current.

The output of the output power control means 106 is input into one of the input terminals of a modulator 108. There is provided a reference sinusoidal wave oscillator means 110 which receives phase signal from the AC power source system 3 and generates a reference sinusoidal wave signal "x" including phase information of the AC power in the AC power source system 103, and an output of the reference sinusoidal wave oscillator means 110 is input into another input terminal of the modulator 108. The modulator 108 operates a current command value of sinusoidal wave form having prescribed phase based on the power command signal $S_{10}$ from the output power control means 106 and a phase information signal X from the reference sinusoidal wave oscillator means 110, and generates a current command signal $S_{11}$ which corresponds to the current command value.

The current command signal $S_{11}$ from the modulator 108 is input into a comparator 112. A current detection element 115 is disposed on an output line of the inverter main circuit 101, and a current detection signal $I_0$ of the current detection element 115 is input into the comparator 112. The comparator 112 compares the current command signal $S_{11}$ from the modulator 108 with the output current detection signal $I_0$ of the inverter main circuit 101, and input the difference signal $S_{12}$ defined by the difference therebetween into an output current control means 109. The output current control means 109 generates a difference signal $S_{13}$ based on the difference signal $S_{12}$, and inputs the difference signal $S_{13}$ into a pulse width modulation control means 11. The pulse width modulation control means 11 generates a pulse width modulated control signal $S_{14}$ based on the control signal $S_{13}$, and sends the control signal $S_{14}$ to the inverter main circuit 101 to control the switching operation thereof. Thus, the control is performed so that the AC output current represented by the current detection signal $I_0$ of the current detection element 115 equals the command value R. The constitution and the operation of the inverter device above are described in Japanese Patent Disclosure Hei8-123561, and more detailed description will be omitted.

In an embodiment of the present invention shown in FIG. 18, adding to the components of the inverter device described above, a current detection element 116 is disposed adjacent to the DC side input terminal "e" of the inverter main circuit 101. A current detection signal "y" which is an output of the current detection element 116 is input into a DC component outflow blocking circuit 107. The reference sinusoidal wave signal "x" from the reference sinusoidal wave oscillator means 110 is also input into the DC component outflow blocking circuit 107.

Figure 19:
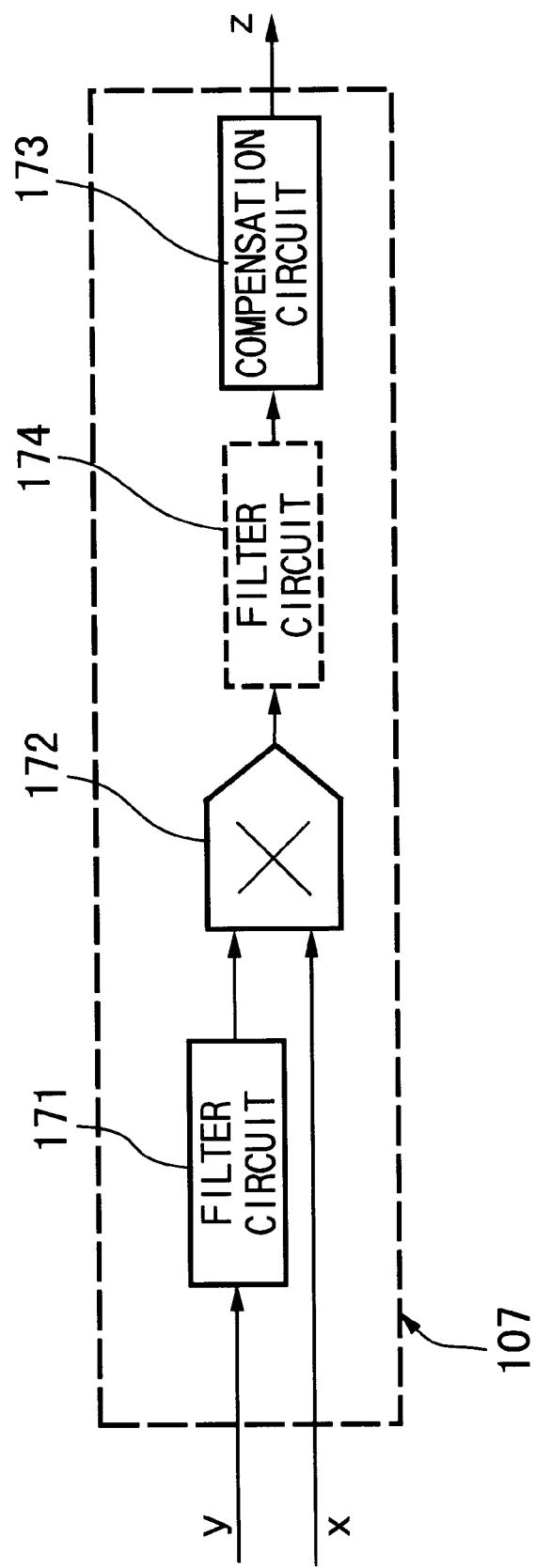
FIG. 19 is a schematic diagram of the DC component outflow blocking means used in the circuit of FIG. 18.

FIG. 19 shows a constitution of the DC component outflow blocking circuit 107, whose main components are a filter circuit 171, a multiplier 172 and a compensation circuit 173. A filter circuit 174 may be added between the multiplier 172 and the compensation circuit 173. The current detection signal "y" from the current detection element 116 is input into one of the input terminals of the multiplier 172 through the filter circuit 171. The reference sinusoidal wave signal "x" from the reference sinusoidal wave oscillator means 110 is input into another input terminal of the multiplier 172. The multiplier 172 multiplies the current detection signal "y" from the current detection element 116 by the reference sinusoidal wave signal "x", and sends its output, the product of both signals, to the compensation circuit 173 through the filter circuit 174. The filter circuit 174 may be omitted.

An operation of the DC component outflow blocking circuit 107 shown in FIG. 19 will be described below. When the high-frequency component caused by the switching operation in the inverter main circuit 101 is neglected, and when the output voltage v and the output current i are controlled to be sinusoidal wave, there exists following condition:

$$v = V_m \cos(\omega t)$$

$$i = I_m \cos(\omega t + \alpha) + I_d$$

where, $V_m$ is a maximum output voltage value, $I_m$ is a maximum output current value, $\omega$ is an angular frequency of the fundamental wave, and $I_d$ is the DC offset included in the output current. At that time, an instantaneous output power is represented as follows.

$$p = v*i = (V_m I_m/2)\cos\alpha + (V_m I_m/2)\cos(2\omega t + \alpha) + V_m I_d \cos(\omega t) \quad (16)$$

In equation (16), a first term represents a mean output power of the inverter device, a second term represents a ripple power component having a frequency twice as much as that of the power source due to an asymmetric property of the single-phase alternating current, and a third term represents a component having the same frequency with that of the power source caused by the DC component of the output current.

When the high-frequency component caused by the switching operation in the inverter main circuit 101 is neglected, an instantaneous value of the DC side current in the inverter device is represented as follows:

$$I_{d-inv} = (p + p_{loss})/V_{dc}$$

where, $p_{loss}$ is a loss of the inverter, and $V_{dc}$ is a DC voltage. When the high-frequency component caused by the switching operation in the inverter main circuit 101 is neglected, a main component of $p_{loss}$ is typically composed of a DC component and a component having a frequency twice as much as that of the power source, and is represented as:

$$p_{loss} = V_m I_{loss}0 + V_m I_{loss}2 \cos(2\omega t + \beta)$$

Therefore, the DC side current of the inverter device is represented as:

$$I_{d-inv} = (V_m I_m/2V_{dc})\cos\alpha + (V_m I_m/2V_{dc})\cos(2\omega t + \alpha) + \quad (17)$$
$$(V_m I_{loss}2/V_{dc})\cos(2\omega t + \beta) + (V_m I_d/V_{dc})\cos(\omega t)$$

In equation (17), a first term represents the DC component, a second and a third terms represent a component having a frequency twice as much as the fundamental frequency, and a fourth term represents a component of the fundamental frequency. Since, among these components of the DC side current, the DC component included in the AC output current has an effect only on the fourth term, the DC component included in the AC output current can be detected by monitoring the fundamental frequency component in the DC side current of the inverter device. That is, when the fundamental frequency component in the DC side current of the inverter device is reduced to zero, the DC component included in the AC output current may be also reduced to zero. As a matter of fact, the DC side current of the inverter device includes lots of high-frequency components caused by the switching operation in the inverter maincircuit 101. In the circuit 107 shown in FIG. 19, the filter circuit 171 works so as to remove these high-frequency components included in the DC side current. The current detection signal "y" whose high-frequency components have been removed is input into multiplier 172 as described above. The multiplier 172 performs operation below.

$$I_{d-inv} \times \cos(\omega t) = [(V_m I_m/2V_{dc})\cos\alpha + (V_m I_m/2V_{dc})\cos(2\omega t + \alpha) + \quad (18)$$
$$(V_m I_{loss}2/V_{dc})\cos(2\omega t + \beta) +$$

-continued $$(V_m I_d / V_{dc}) \cos(\omega t)] \cos(\omega t)$$
$$= (V_m I_m / 2V_{dc}) \cos\alpha \cos(\omega t) +$$
$$(V_m I_m / 4V_{dc})[\cos(\omega t + \alpha) + \cos(2\omega t + \alpha)] +$$
$$(V_m I_{loss} 2 / V_{dc})[\cos(\omega t + \beta) + \cos(2\omega t + \beta)] +$$
$$(V_m I_d / 2V_{dc}) \cos(2\omega t) + V_m I_d / 2V_{dc}$$

When the output of the multiplier 172 is made to pass through the low-pass filter to remove the AC component, only the last term of equation (18), ($V_m I_d/2V_{dc}$) is left. This signal has a proportional relation with the DC component included in the AC side current of the inverter device, so that the DC component flown out to the AC side can be detected when this signal is obtained.

Figure 20:
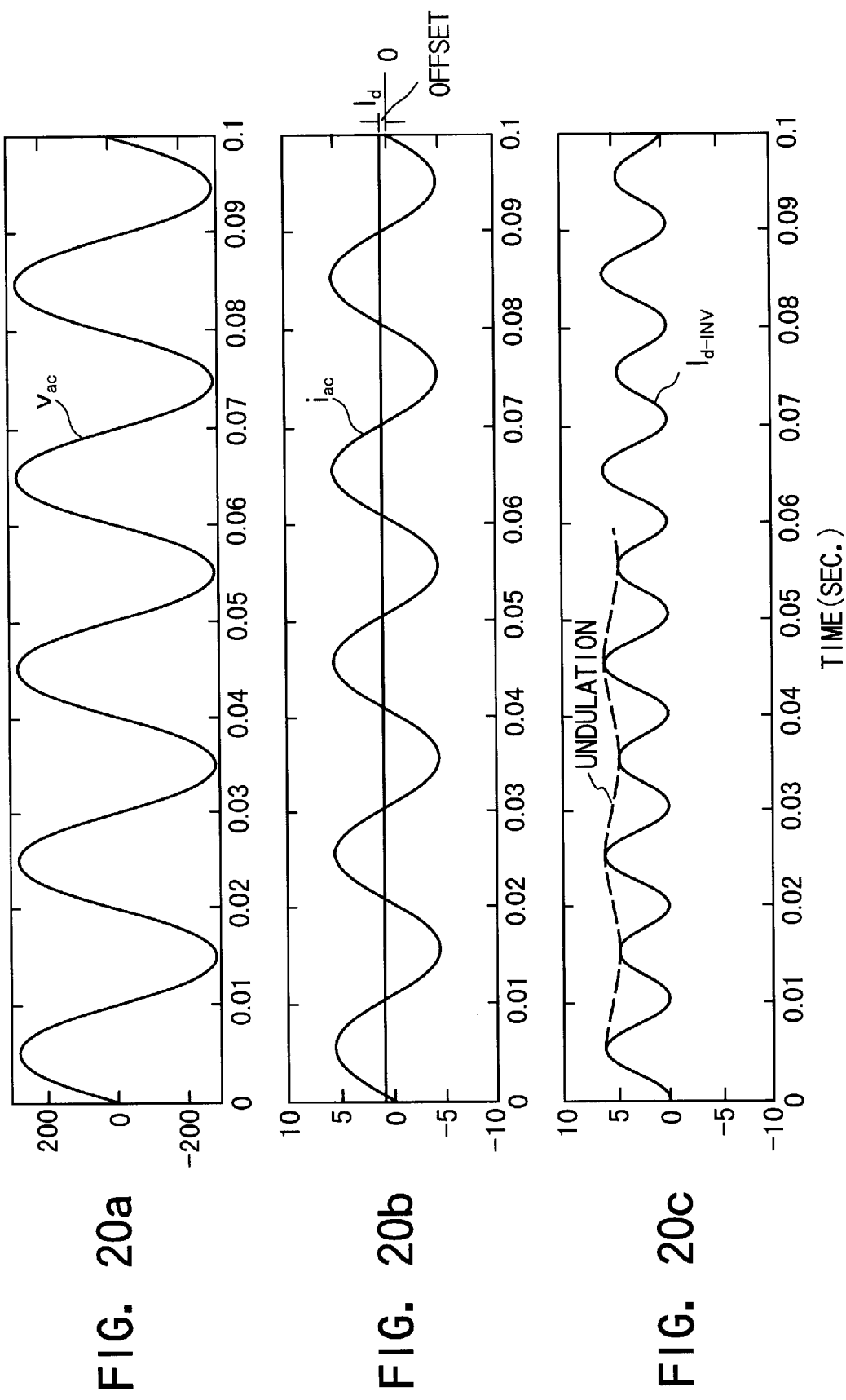
FIGS. 20(a–c) are waveform diagrams of AC voltage, alternating current and direct current of the inverter device for illustrating a principle of DC component detection according to the present invention.

FIG. 20 shows waveform diagrams of the AC side output voltage, AC side alternating current and the DC side direct current of the inverter device, wherein the AC side output voltage $V_{ac}$ has a form of sinusoidal wave as shown in FIG. 20(a). The AC side output current $i_{ac}$ has a waveform shown in FIG. 20(b) which may include the DC component as a form of offset value. FIG. 20(c) shows a waveform of the DC side current $I_{d\text{-}inv}$ of the inverter device. When the DC component is included in the AC side output, the DC side current $I_{d\text{-}inv}$ includes a surge component as shown by a broken line in FIG. 20(c). A frequency of the surge component is equal to that of the AC side output voltage $V_{ac}$. When the offset value which is a DC component in the AC side output current $i_{ac}$ is positive, the surge component has the same phase with the AC side output voltage $V_{ac}$. When the offset value is negative, the surge component has an opposite phase against the AC side output voltage $V_{ac}$.

The above operation by the multiplier 172 and the processing by the filter circuit 174 are performed to detect the offset component from the surge component.

($V_m I_d/2V_{dc}$) signal which represents the DC component in the AC side obtained from the output of the multiplier 172 through the filter circuit 174 is sent to the compensation circuit 173. The compensation circuit 173 is preferably provided with an element of integrating function, which may be made up of an integrator or a proportional-integrator, and generates a compensation signal "z" which makes the output from the filter circuit 174 zero. The compensation signal "z" is input into the comparator 12 with reverse polarity, and is added to the current command signal $S_{11}$. Since the integrator or the proportional-integrator has an inherent characteristic as a low pass filter which provides high gain for the low frequency component and low gain for high frequency component, so that, when the compensation circuit 173 is made up of the integrator or the proportional-integrator, the filter circuit 174 may be omitted, which allows to make the constitution of the DC component blocking means 7 be simple.

Because of the constitution described above, the DC component can be removed from the AC side output. In this constitution, however, when there is an error such as offset in the reference sinusoidal wave synchronized with the AC power source system or in the multiplier, there may occur an error in the compensation signal. This problem may be solved by substituting a digital circuit for the reference sinusoidal wave oscillator means 110 and by constituting the multiplier 172 with a digital circuit. In addition, the filter circuit 174 and the compensation circuit 173 are preferably constituted as digital circuits. Especially in the system interconnection inverter device with a digital-type controller, only necessary matter to employ the present invention is to modify its software slightly.

In the present invention, though it is necessary to install the current detection element in the input side of the inverter main circuit 101, all the function required for this current detection element is merely to detect the fundamental wave frequency component included in the current. That is, since there is almost no effect of the error of offset or gain of the current detection element, a low-cost current detection element may be employed to reduce the cost of overall device. In addition, since the effect of temperature change and aged deterioration may be minimized, a highly reliable device may be accomplished.

In this invention, since the offset current of the output current is detected while observing the component with specific frequency included in the DC side input current of the inverter device, not only an effect of the offset or the drift of the current detection element but also the offset or the drift of the filter circuit and other peripheral equipments may be integrally compensated, so that the system may be constructed so as for the peripheral circuits to have no effect thereon. Accordingly, the peripheral circuits may employ low-cost element or circuit constitution. Especially in the special usage requiring high-speed, safety and more reliability, the DC component included in the AC output component may be controlled or removed more effectively when the present method and the conventional one in which the offset of the current detection element installed in the AC side is compensated are used at the same time.

Figure 21:
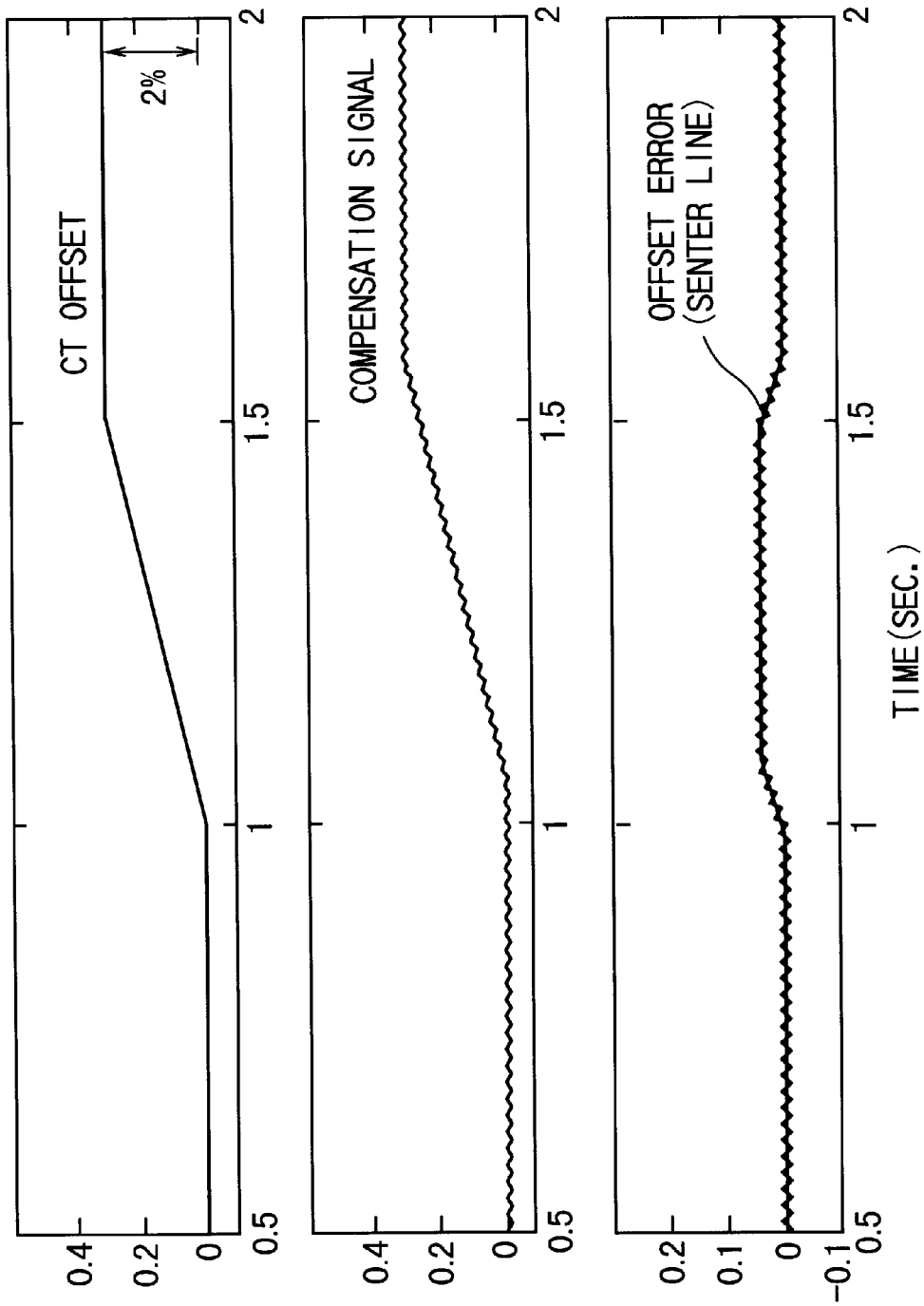
FIGS. 21(a–c) are diagrams illustrating an effect of the embodiment of FIG. 18, wherein (a) is an offset current applied as a disturbance, (b) is a compensation signal caused thereby; and (c) is an offset error emerging into the inverter output.

FIG. 21 illustrates an experimental effect of the invention, which shows response waveforms when, in FIG. 18, the offset voltage is purposely applied to the output signal $I_0$ of the AC side output current detection element 115. When the offset current corresponding to 2% of the rated current is applied as shown in FIG. 21(a), the compensation signal "z" which is an output of the compensation circuit 173 increases as shown in FIG. 21(b). As the compensation signal "z" increases, the offset error is reduced to zero as shown in FIG. 21(c).

Figure 22:
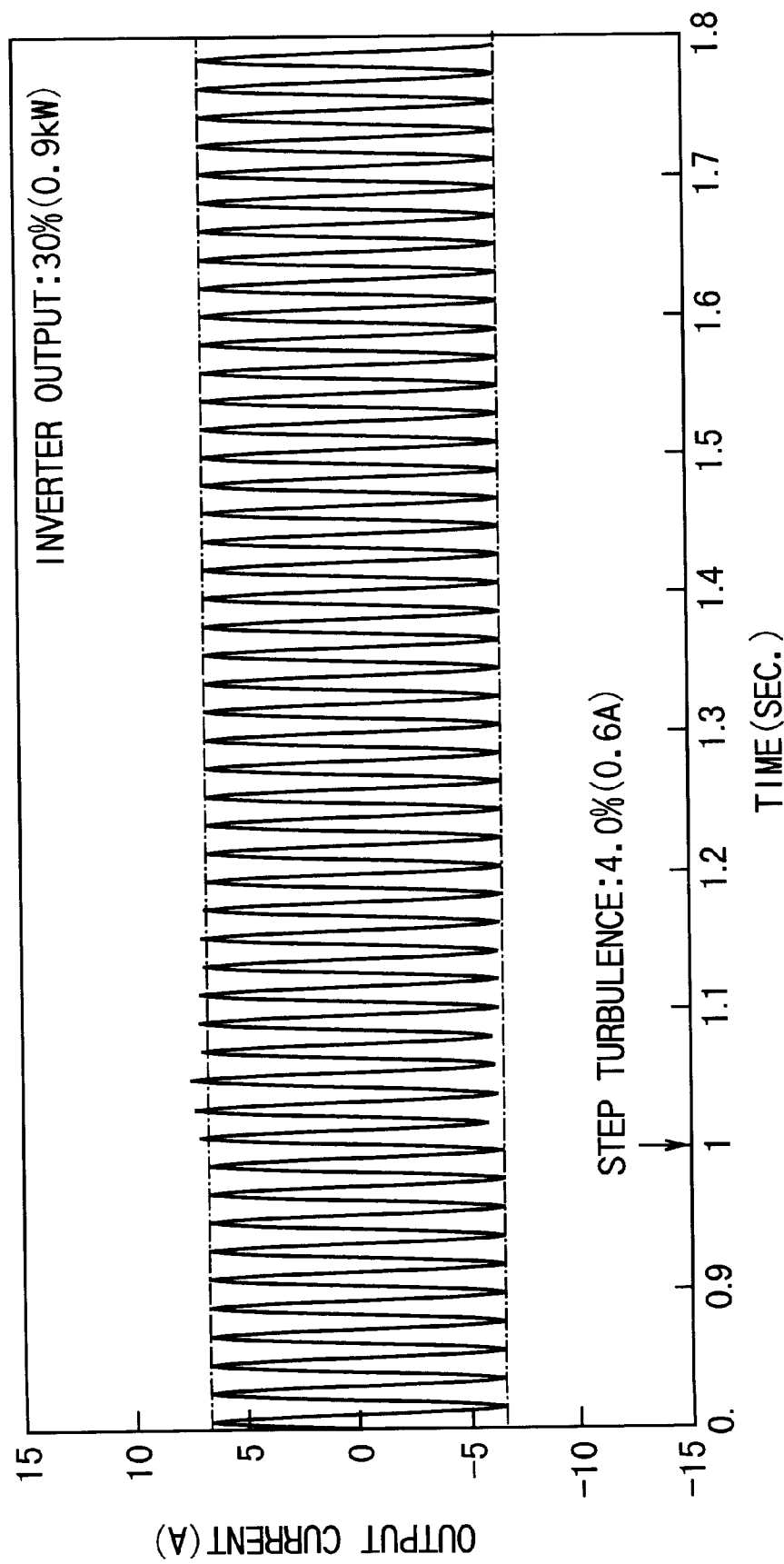
FIG. 22 is a diagram illustrating a convergence of the offset when a step disturbance is applied to the AC output of the inverter device.

FIG. 22 shows an effect of the invention when the commercial AC power source system with 200 V single-phase is connected to the inverter device with 3 kW of rated power and 350 V of DC input voltage. It is found that when the step disturbance of 0.6 A which corresponds to 4.0% of the output current is applied while the inverter is being operated with 0.9 kW output which corresponds to 30% of the rated output, the offset emerges temporally in the inverter output but converges instantaneously.

What is claimed is:

1. An electric power conversion device connected between a direct current power system and an alternating current power system for transferring electric power between the direct current power system and the alternating current power system, said device comprising:

an alternating current section connected to said alternating current power system;

a direct current section connected to said direct current power system;

a switching section which is connected between said direct current section and said alternating current section and performs power conversion by switching operation; and a control section for controlling said switching section;

wherein said direct current section is provided with a ripple detection means for detecting a ripple component emerging in a direct current side and for generating a ripple detection signal; and said control section receives said ripple detection signal from said ripple detection means, generates a direct current component compensation signal for controlling a direct current component included in a current of said alternating current section based on said ripple detection signal, and controls said switching section by a control signal including said direct current component compensation signal to compensate the direct current component included in said alternating current section.

2. An electric power conversion device as claimed in claim 1, in which said ripple detection means comprises a current detection element for detecting a current ripple component emerging into said direct current section.

3. An electric power conversion device as claimed in claim 1, in which said ripple detection means comprises a voltage detection element for detecting a voltage ripple component emerging into said direct current side.

4. An electric power conversion device as claimed in claim 1, in which:
   said alternating current power system is a three-phase alternating current system; and
   said control section includes a direct current component outflow blocking means which comprises a first filter, a first multiplier section, a second multiplier section, a first compensation section, a second compensation section, and a phase conversion section; wherein:
      said first filter extracts a component having the same frequency with that of the fundamental wave component of the three-phase alternating current from said ripple detection signal;
      said first multiplier section multiplies a signal supplied from said first filter by a first reference sinusoidal wave having the same frequency with that of the fundamental wave of the three-phase alternating current;
      said second multiplier section multiplies the signal supplied from said first filter by a second reference sinusoidal wave which has the same frequency with that of the fundamental wave of the three-phase alternating current and also has 90 degree of electric phase difference from said first reference sinusoidal wave;
      said first compensation section generates a compensation signal for compensating a direct current component included in an output current of the three-phase alternating current in response to an output of said first multiplier section;
      said second compensation section generates a compensation signal for compensating the direct current component included in the output current of the three-phase alternating current in response to an output of said second multiplier section; and
      said phase conversion section converts two compensation signals supplied by said first compensation section and said second compensation section so as to have the same number of phase with the three-phase alternating current.

5. An electric power conversion device as claimed in claim 4, in which:
   said direct current component outflow blocking means further comprises a second filter and a third filter, wherein:
      said second filter extract a low-frequency component of a signal output from said first multiplier section and supplies an extracted signal to said first compensating section; and
      said third filter extract a low-frequency component of a signal output from said second multiplier section and supplies an extracted signal to said second compensating section.

6. An electric power conversion device as claimed in claim 1, in which said control section performs digital processing.

7. An electric power conversion device as claimed in claim 1, in which:
   said direct current power system includes a direct current power source connected to said direct current section; and
   said alternating current power system is connected to said alternating current section.

8. An electric power conversion device as claimed in claim 7, in which said alternating current power system is a three-phase alternating current power system with neutral non-grounding.

9. An electric power conversion device as claimed in claim 7, in which said electric power conversion device constitutes either of DC—AC inverter or AC—DC converter.

10. An electric power conversion device as claimed in claim 7, said device further comprising a direct current type loading.

11. An electric power conversion device as claimed in claim 1, said device further comprising an uninterruptible power supply unit.

12. An electric power conversion device connected to an alternating current power source to use it, said device comprising:
   an electronic power conversion means provided with a direct current connecting section connected to a direct current power source and an alternating current connecting section connected to an alternating current power source;
   an output power control means for controlling an output power of said electric power conversion means;
   a modulator means for operating an alternating current command value based on an output power command signal given by said output power control means and for generating an alternating current command signal; and
   a current control means for controlling said electric power conversion means based on the current command signal given by said modulator means;
   said device characterized by further comprising:
   a current detection means for detecting a current of direct current side of said electric power conversion means; and
   a direct current component outflow blocking means for detecting a direct current component included in an alternating current output emerging into said alternating current connecting section from a detected current value by said current detection means and for generating a signal for removing or reducing said direct current component.

13. An electric power conversion device as claimed in claim 12, in which said direct current component outflow blocking means comprises:
   a filter means for extracting a current component having the same frequency with that of an alternating current fundamental wave component from a current signal which is an output of said current detection means;
   a multiplier for multiplying a reference sinusoidal wave synchronized with a system including said alternating current power source by an output signal of said filter means; and
   a compensating means for compensating the direct current component of the alternating current output current in response to an output of said multiplier.

14. An electric power conversion device as claimed in claim 13, in which:

said multiplier is a digital multiplier;

said filter means and said compensation means are constituted as digital means;

said direct current component outflow blocking means has a reference sinusoidal wave digital signal synchronized with the system including said alternating current power source; and a multiplication between said reference sinusoidal wave and the output signal of said filter means is performed in digital form.

15. An electric power conversion device as claimed in claim 13, in which said direct current component outflow blocking means operates a compensation signal for compensating the direct current component of the alternating current output current based on an output of said multiplier using said compensation means and adds said compensation signal with reverse polarity to said alternating current command signal.

16. An electric power conversion device as claimed in claim 12, in which a direct current detecting function is omitted from said current detection means.

* * * * *